US012202967B2

(12) United States Patent
McCall

(10) Patent No.: US 12,202,967 B2
(45) Date of Patent: Jan. 21, 2025

(54) POLYESTER POLYMER NANOCOMPOSITES

(71) Applicant: Kintra Fibers, Inc., Brooklyn, NY (US)

(72) Inventor: William McCall, Brooklyn, NY (US)

(73) Assignee: Kintra Fibers, Inc., Brooklyn, NY (US)

( * ) Notice: Subject to any disclaimer, the term of this patent is extended or adjusted under 35 U.S.C. 154(b) by 568 days.

(21) Appl. No.: 17/618,809

(22) PCT Filed: Jun. 17, 2020

(86) PCT No.: PCT/US2020/038160
§ 371 (c)(1),
(2) Date: Dec. 13, 2021

(87) PCT Pub. No.: WO2020/257298
PCT Pub. Date: Dec. 24, 2020

(65) Prior Publication Data
US 2022/0235162 A1  Jul. 28, 2022

Related U.S. Application Data

(60) Provisional application No. 62/863,029, filed on Jun. 18, 2019.

(51) Int. Cl.
| C08L 67/02 | (2006.01) |
| C08F 251/02 | (2006.01) |
| C08G 63/16 | (2006.01) |
| C08L 1/02 | (2006.01) |

(52) U.S. Cl.
CPC ............ *C08L 67/02* (2013.01); *C08F 251/02* (2013.01); *C08G 63/16* (2013.01); *C08L 1/02* (2013.01); *C08K 2201/005* (2013.01)

(58) Field of Classification Search
CPC combination set(s) only.
See application file for complete search history.

(56) References Cited

U.S. PATENT DOCUMENTS

| 7,985,566 B2 | 7/2011 | Aoshima et al. |
| 9,796,849 B2 | 10/2017 | Berry et al. |
| 10,870,727 B2 | 12/2020 | Aoshima et al. |
| 11,396,598 B2 | 7/2022 | Oh et al. |
| 2008/0319152 A1 | 12/2008 | Okamoto et al. |
| 2012/0277351 A1 | 11/2012 | Yano et al. |
| 2013/0313477 A1 | 11/2013 | Beck et al. |
| 2015/0011792 A1 | 1/2015 | Gehringer et al. |
| 2016/0319467 A1 | 11/2016 | Yamato et al. |
| 2019/0194400 A1 | 6/2019 | Wu et al. |
| 2020/0216660 A1 | 7/2020 | Oh et al. |
| 2020/0331661 A1 | 10/2020 | Prouvost et al. |
| 2021/0238413 A1 | 8/2021 | Song et al. |
| 2022/0235162 A1 | 7/2022 | McCall |
| 2022/0282048 A1 | 9/2022 | Hwang et al. |
| 2022/0282069 A1 | 9/2022 | Tanaka et al. |
| 2023/0108915 A1 | 4/2023 | Murakami et al. |

FOREIGN PATENT DOCUMENTS

| CN | 102295827 A | 12/2011 |
| JP | 2013-519736 A | 5/2013 |
| KR | 10-2069075 B1 | 1/2020 |
| WO | WO 2006/115226 A1 | 11/2006 |
| WO | WO 2018/081493 A2 | 5/2018 |
| WO | WO 2018/236151 A1 | 12/2018 |
| WO | WO 2019/215373 A2 | 11/2019 |
| WO | WO 2019/216700 A1 | 11/2019 |
| WO | WO 2020/257298 A1 | 12/2020 |
| WO | WO 2021/006480 A1 | 1/2021 |
| WO | WO 2021/131181 A1 | 7/2021 |
| WO | WO 2021/201185 A1 | 10/2021 |
| WO | WO 2021/241712 A1 | 12/2021 |

OTHER PUBLICATIONS

Machine translation of WO 2018/236151 (no date).*
Canadian Intellectual Property Office, Office Action, Canadian Patent Application No. 3,144,632, Sep. 21, 2022, seven pages.
PCT International Search Report and Written Opinion, PCT Application No. PCT/US2021/065081, Mar. 22, 2022, 14 pages.
George, J. et al. "Cellulose Nanocrystals: Synthesis, Functional Properties, and Applications." Nanotechnology Science and Applications, vol. 8, Nov. 4, 2015, pp. 45-54.
Habibi, Y. et al. "Cellulose Nanocrystals: Chemistry, Self-Assembly, and Applications." Chemical Reviews, vol. 110, No. 6, Mar. 4, 2010, pp. 3479-3500.
Lu, P. et al. "Cellulose Isolation and Core-Shell Nanostructures of Cellulose Nanocrystals from Chardonnay Grape Skins." Carbohydrate Polymers, vol. 87, No. 1, Mar. 1, 2012, pp. 2546-2553.
Tserki, V. et al. "Biodegradable Aliphatic Polyesters. Part I. Properties and Biodegradation of Poly(butylene succinate-co-butylene adipate)." Polymer Degradation and Stability, vol. 91, No. 2, Feb. 2006, pp. 367-376.

(Continued)

*Primary Examiner* — Marc S Zimmer
(74) *Attorney, Agent, or Firm* — Fenwick & West LLP; Glenn Foulds; Brennan A. Murphy

(57) ABSTRACT

Aspects of the present disclosure include compositions of and methods for producing a polymer-polysaccharide nanocomposite resin, including preparing a dispersion comprising polysaccharide nanocrystals, an alkane diol monomer and an alkane diacid agent monomer; polycondensing the alkane diol monomer and the alkane diacid agent monomer in the dispersion to produce a polymer-polysaccharide nanocomposite resin. Aspects of the present disclosure further include compositions of and methods for producing a polybutylene succinate nanocomposite, including dispersing cellulose nanocrystals in 1,4 butanediol (BDO) to form a cellulose-BDO dispersion and esterifying the cellulose-BDO dispersion and succinate anhydride to form a plurality of polybutylene succinate oligomers. The polybutylene succinate oligomers are condensed to form a polybutylene succinate nanocomposite.

20 Claims, 8 Drawing Sheets

(56) References Cited

OTHER PUBLICATIONS

Zheng, L. et al. "Novel Poly(butylene fumarate) and Poly(butylene succinate) Multiblock Copolymers Bearing Reactive Carbon—Carbon Double Bonds: Synthesis, Characterization, Cocrystallization, and Properties." Industrial & Engineering Chemistry Research, vol. 52, Apr. 15, 2013, pp. 6147-6155.
European Patent Office, Extended European Search Report, European Patent Application No. 20825916.8, Jun. 7, 2023, eight pages.
Beck, S., et al. "Dispersibility in Water of Dried Nanocrystalline Cellulose," Biomacromolecules, vol. 13, No. 5, Apr. 6, 2012, pp. 1486-1494.
Morelli, C. L., et al. "Nanocomposites of PBAT and Cellulose Nanocrystals Modified by in situ Polymerization and Melt Exclusion," Polymer Engineering & Science, vol. 56, No. 12, Dec. 2016, pp. 1339-1348.
United States Office Action, U.S. Appl. No. 18/213,685, filed Sep. 14, 2023, 13 pages.
PCT International Search Report and Written Opinion, International Application No. PCT/US2020/038160, dated Sep. 28, 2020, 9 Pages.
Xianlou, W., et al. "A Basic Knowledge of Polyester Production," Textile Industry Publishing House, Dec. 31, 1993.
"Organic Chemistry," Organic Chemistry Teaching and Research, Tianjin University, Sep. 30, 1978.

\* cited by examiner

POLYESTER POLYMER NANOCOMPOSITES

CROSS REFERENCE TO RELATED APPLICATIONS

This application is the National Stage of International Application No. PCT/US2020/038160, filed Jun. 17, 2020, which claims priority to U.S. Provisional No. 62/863,029, filed Jun. 18, 2019, the disclosure of which is incorporated by reference in its entirety.

INTRODUCTION

Polybutylene succinate (PBS) is typically synthesized by performing an esterification reaction between 1,4 butanediol and succinic acid, then condensing the oligomer products to form PBS. A common method for increasing the molecular weight of PBS is by adding a chain extender such as a carbonate or a diisocyanate.

One byproduct of PBS production is tetrahydrofuran (THF), which is a hazardous waste formed when 1,4 butanediol cyclizes. Diisocyanate chain extenders are a non-renewable resource that is also potentially toxic and requires additional processing steps to use.

There remains a need for a method for producing polymer-polysaccharide nanocomposite resins that reduces the amount of waste produced, while at the same time, utilizes renewable raw materials to improve the properties of the obtained product.

SUMMARY

Aspects of the present disclosure include compositions of and methods for producing a polyester polymer-polysaccharide nanocomposite resin, including preparing a dispersion comprising polysaccharide nanocrystals, an alkane diol monomer and an alkane diacid agent monomer; polycondensing the alkane diol monomer and the alkane diacid agent monomer in the dispersion to produce a polymer-polysaccharide nanocomposite resin. Aspects of the present disclosure further include compositions of and methods for producing a polybutylene succinate nanocomposite, including dispersing cellulose nanocrystals in 1,4 butanediol (BDO) to form a cellulose-BDO dispersion and esterifying the cellulose-BDO dispersion and succinate anhydride to form a plurality of polybutylene succinate oligomers. The polybutylene succinate oligomers are condensed to form a polybutylene succinate nanocomposite.

In another embodiment, the method comprises adding cellulose nanocrystals to 1,4 butanediol to form a cellulose-BDO mixture, and then sonicating the cellulose-BDO mixture to disperse the cellulose nanocrystals in 1,4 butanediol form a cellulose-BDO dispersion. Succinate derivatives are esterified to the cellulose-BDO dispersion to form a plurality of polybutylene succinate oligomer. The polybutylene succinate oligomers are condensed to form a polybutylene succinate nanocomposite.

Another embodiment of the method comprises adding cellulose nanocrystals to 1,4 butanediol to form a cellulose-BDO mixture and sonicating the cellulose-BDO mixture to disperse the cellulose nanocrystals in 1,4 butanediol and form a cellulose-BDO dispersion. The cellulose-BDO dispersion and succinate anhydride are esterified to form a plurality of polybutylene succinate oligomers, which are then condensed to form a polybutylene succinate nanocomposite.

DETAILED DESCRIPTION

Figure 1:
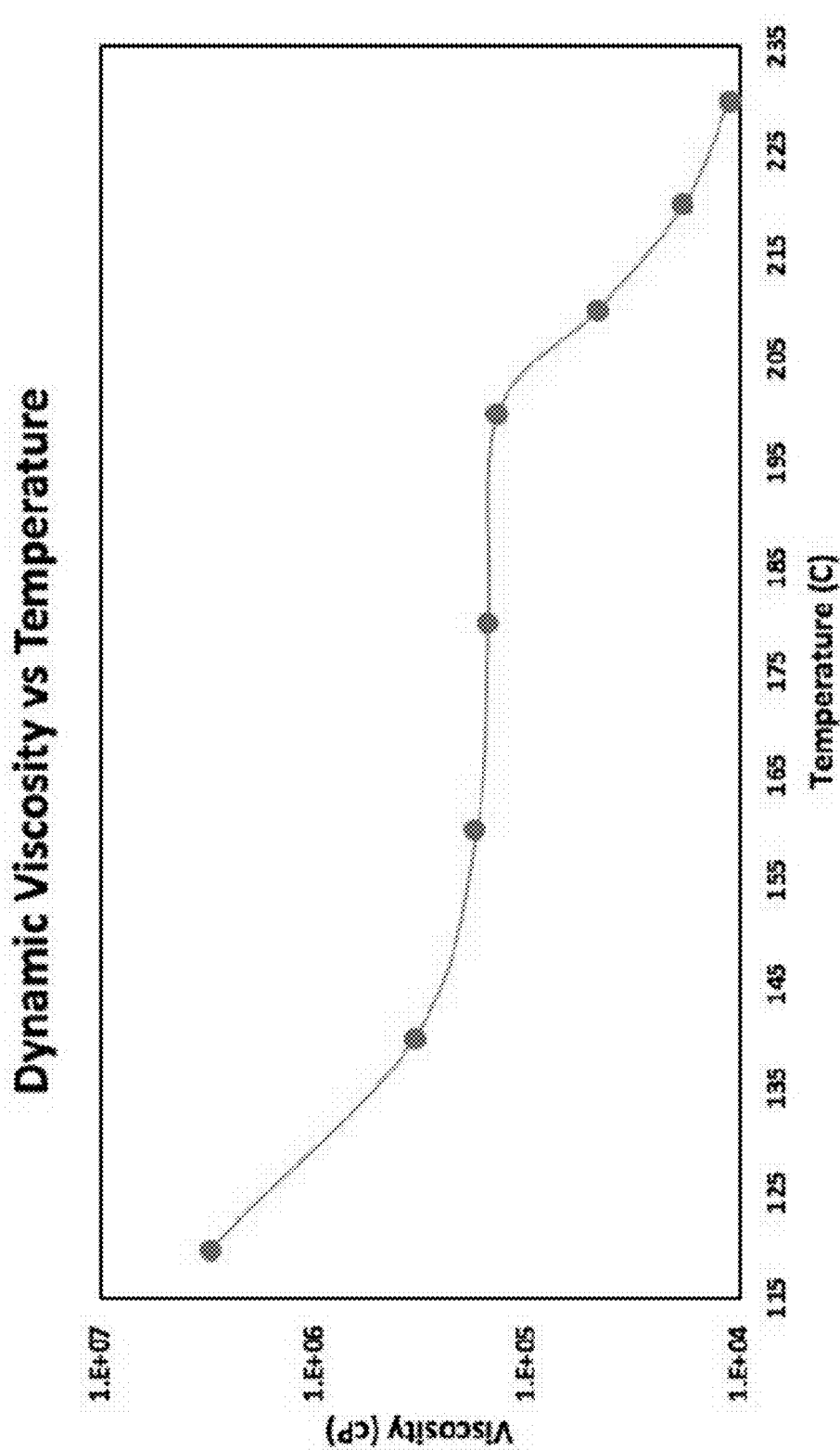
FIG. 1 is a plot of dynamic viscosity versus temperature for a polybutylene succinate nanocomposite synthesized from cellulose nanocrystals dispersed into 1,4 butanediol using a homogenizer and esterified with epoxidized linseed oil.

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items.

The term "about," as used herein when referring to a measurable value such as an amount of a compound, dose, time, temperature, and the like, is meant to encompass variations of 20%, 10%, 5%, 1%, 0.5%, or even 0.1% of the specified amount. Unless otherwise defined, all terms, including technical and scientific terms used in the description, have the same meaning as commonly understood by one of ordinary skill in the art to which this invention belongs.

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

As used herein, the term "consists essentially of" (and grammatical variants thereof), as applied to the compositions and methods of the present invention, means that the compositions/methods may contain additional components so long as the additional components do not materially alter the composition/method. The term "materially alter," as applied to a composition/method, refers to an increase or decrease in the effectiveness of the composition/method of at least about 20% or more.

All patents, patent applications and publications referred to herein are incorporated by reference in their entirety. In case of a conflict in terminology, the present specification is controlling.

Aspects of the present disclosure include compositions of and methods for producing a polymer-polysaccharide nanocomposite resin, including preparing a dispersion comprising polysaccharide nanocrystals, an alkane diol monomer and an alkane diacid agent monomer; polycondensing the alkane diol monomer and the alkane diacid agent monomer in the dispersion to produce a polymer-polysaccharide nanocomposite resin. Aspects of the present disclosure further include compositions of and methods for producing a polybutylene succinate nanocomposite, including dispersing cellulose nanocrystals in 1,4 butanediol (BDO) to form a cellulose-BDO dispersion and esterifying the cellulose-BDO dispersion and succinate anhydride to form a plurality of polybutylene succinate oligomers. The polybutylene succinate oligomers are condensed to form a polybutylene succinate nanocomposite.

Polyester Polymer-Polysaccharide Nanocomposite Resin

Aspects of the present disclosure include compositions of a polyester polymer-polysaccharide nanocomposite resin.

A nanocomposite, used herein in its conventional sense, is generally comprised of multiple nanoscale materials or a nanoscale material incorporated into a bulk material. Nanocomposites can be a multiphase solid material where one of the phases has one, two, or three dimensions or structures having nano-scale repeat distances between the different phases that make up the material. Thus, a nanocomposite can include nanoparticles entrained in a polymer matrix.

In some embodiments, a polyester polymer-polysaccharide nanocomposite resin includes an increased modulus and strength by the addition of the nanocomposites as to provide reinforcing fibers.

In some embodiments, the polyester polymer-polysaccharide nanocomposite resin may act to reinforce the base polymer resin and thereby enhance one or more mechanical properties of the base resin. Non-limiting properties that may be improved through the incorporation of polysaccharide nanoparticles in the base polyester polymer resin may be selected from at least one of the following: modulus of elasticity, tensile yield stress, hoop stress rating, flexural modulus, UV resistance, and reduced rate of gas transmission. The present disclosure therefore allows a measurable enhancement in performance to be achieved without a significant loss of other desirable characteristics, such as tensile strength, ultimate elongation, melt index, thermal stability, impact strength, slow crack growth resistance and rapid crack propagation resistance.

In some embodiments, the polyester polymer-polysaccharide nanocomposite resin provides an improved yield stress of at least 1%, at least 2%, at least 3%, at least 4%, at least 5%, at least 6%, at least 7%, at least 8%, at least 9%, or at least 10%, as compared to the base polymer alone, i.e., a composition lacking polysaccharide nanoparticles. In some embodiments, the polyester polymer-polysaccharide nanocomposite resin provides an improved yield stress of at least 10%, at least 20%, at least 30%, at least 40%, at least 50%, at least 60%, at least 70%, at least 80%, or at least 90%, as compared to the base polymer alone. In some embodiments, the polyester polymer-polysaccharide nanocomposite resin provides an improved yield stress of up to 200%, such as up to 100% as compared to the base polymer alone. In some embodiments, the polyester polymer-polysaccharide nanocomposite resin provides an improved yield stress ranging from 10% to 15%, 15% to 20%, 20% to 25%, 25% to 30%, 30% to 35%, 35% to 40%, 40% to 45%, or 45% to 50%, as compared to the base polymer alone.

In some embodiments, the polyester polymer-polysaccharide nanocomposite resin has a tensile strength ranging from about 10 MPa to about 60 MPa. In some embodiments, the polyester polymer-polysaccharide nanocomposite resin has a tensile strength ranging from about 10 MPa to about 15 MPa, about 15 MPa to about 20 MPa, about 20 MPa to about 25 MPa, about 25 MPa to about 30 MPa, about 30 MPa to about 35 MPa, about 35 MPa to about 40 MPa, about 40 MPa to about 45 MPa, about 45 MPa to about 50 MPa, about 50 MPa to about 55 MPa, about 55 MPa to about 60 MPa, about 60 MPa to about 65 MPa, or about 65 MPa to about 70 MPa. In some embodiments, the polyester polymer-polysaccharide nanocomposite resin has a tensile strength of about 10 MPa or more, about 15 MPa or more, about 15 MPa or more, about 20 MPa or more, about 20 MPa or more, about 25 MPa or more, about 25 MPa or more, about 30 MPa or more, about 30 MPa to about 35 MPa, or more, about 35 MPa or more, 40 MPa or more, about 45 MPa or more, about 45 MPa or more, about 50 MPa or more, about 50 MPa or more, about 55 MPa or more, about 55 MPa or more, about 60 MPa or more, about 65 MPa or more, or about 70 MPa or more. In some embodiments, the polyester polymer-polysaccharide nanocomposite resin has a tensile strength ranging from about 20 MPa to about 35 MPa. In some embodiments, the polymer-polysaccharide nanocomposite resin has a tensile strength ranging from about 20 MPa to about 40 MPa. In some embodiments, the polyester polymer-polysaccharide nanocomposite resin has a tensile strength ranging from about 20 MPa to about 60 MPa. In some embodiments, the polymer-polysaccharide nanocomposite resin has a tensile strength ranging from about 20 MPa to about 70 MPa. In some embodiments, the polyester polymer-polysaccharide nanocomposite resin has a tensile strength ranging from about 10 MPa to about 70 MPa.

In some embodiments, the polyester polymer-polysaccharide nanocomposite resin has a modulus of stiffness ranging from 250 MPa to about 450 MPa. In some embodiments, the polyester polymer-polysaccharide nanocomposite resin has a modulus or stiffness ranging from 300 MPa to 400 MPa. In some embodiments, the polyester polymer-polysaccharide nanocomposite resin has a modulus or stiffness of 300 MPa or more, 305 MPa or more, 310 MPa or more, 315 MPa or more, 320 MPa or more, 330 MPa or more, 340 MPa or more, 350 MPa or more, 360 MPa or more, 370 MPa or more, 380 MPa or more, 390 MPa or more, or 400 MPa or more.

In some embodiments, the polyester polymer-polysaccharide nanocomposite resin has a modulus of elasticity ranging from 0.10 GPa to about 1.0 GPa. In some embodiments, the polyester polymer-polysaccharide nanocomposite resin has a modulus of elasticity ranging from 0.20 GPa to about 0.5 GPa. In some embodiments, the polymer-polysaccharide nanocomposite resin has a modulus of elasticity ranging from 0.20 GPa to about 0.4 GPa. In some embodiments, the polyester polymer-polysaccharide nanocomposite resin has a modulus of elasticity of 0.10 GPa or more, 0.15 GPa or more, 0.20 GPa or more, 0.25 GPa or more, 0.30 GPa or more, 0.35 GPa or more, 0.40 GPa or more, 0.45 GPa or more, or 0.50 GPa or more.

In some embodiments, the polyester polymer-polysaccharide nanocomposite resin has a tensile strain (εu) percentage ranging from 10% to about 300%. In some embodiments, the polyester polymer-polysaccharide nanocomposite resin has a tensile strain (εu) percentage ranging from 20% to 200%. The polyester polymer-polysaccharide nanocomposite resin can have a tensile strain (εu) percentage of 10% or more, 20% or more, 30% or more, 40% or more, 50% or more, 60% or more, 70% or more, 80% or more, 90% or more, 100% or more, 110% or more, 120% or more, 130% or more, 140% or more, 150% or more, 160% or more, 170% or more, 180% or more, 190% or more, 200% or more, 210% or more, 220% or more, 230% or more, 240% or more, 250% or more, 260% or more, 270% or more, 280% or more, 290% or more, or 300% or more.

In some embodiments, the polyester polymer-polysaccharide nanocomposite resin has an intrinsic viscosity ranging from about 0.10 to about 1.50 dL/g. In some embodiments, the polyester polymer-polysaccharide nanocomposite resin has an intrinsic viscosity ranging from about 0.20 to about 0.50 dL/g. In some embodiments, the polyester polymer-polysaccharide nanocomposite resin has an intrinsic of about 0.10 dL/g or more, 0.15 dL/g or more, 0.20 dL/g or more, 0.25 dL/g or more, 0.30 dL/g or more, 0.35 dL/g or more, 0.40 dL/g or more, 0.45 dL/g or more, 0.50 dL/g or more, 0.55 dL/g or more, 0.60 dL/g or more, 0.65 dL/g or more, 0.70 dL/g or more, 0.75 dL/g or more, 0.80 dL/g or more, 0.85 dL/g or more, 0.90 dL/g or more, 0.95 dL/g or more, 1.0 dL/g or more, 1.10 dL/g or more, 1.15 dL/g or more, 1.20 dL/g or more, 1.25 dL/g or more, 1.30 dL/g or more, 1.35 dL/g or more, 1.40 dL/g or more, 1.45 dL/g or more, or 1.50 dL/g or more.

In some embodiments, the polyester polymer-polysaccharide nanocomposite resin has a has a relative viscosity ranging from about 3 to about 150. In some embodiments, the polyester polymer-polysaccharide nanocomposite resin has a has a relative viscosity ranging from about 3 to about 5, about 5 to about 7, about 7 to about 10, about 10 to about 15, about 15 to about 20, about 20 to about 25, about 25 to about 30, about 30 to about 35, about 35 to about 40, about 40 to about 45, about 45 to about 50, about 50 to about 55, about 55 to about 60, about 60 to about 65, about 65 to about 70, about 70 to about 75, about 75 to about 80, about 80 to about 85, about 85 to about 90, about 90 to about 95, about 95 to about 100, about 100 to about 105, about 105 to about 110, about 110 to about 115, about 115 to about 120, about 120 to about 125, about 125 to about 130, about 130 to about 135, about 135 to about 140, about 140 to about 145, or about 145 to about 150.

In some embodiments, the polyester polymer-polysaccharide nanocomposite resin has a has a melt viscosity, ranging from about 500 to about 15,000 cP. In some embodiments, the polyester polymer-polysaccharide nanocomposite resin has a has a melt viscosity, ranging from about 500 to about 10,000 cP. In some embodiments, the polyester polymer-polysaccharide nanocomposite resin has a has a melt viscosity, ranging from about 500 to about 1,000 cP. In some embodiments, the polyester polymer-polysaccharide nanocomposite resin has a has a melt viscosity, ranging from about 800 to about 10,000 cP. In some embodiments, the polyester polymer-polysaccharide nanocomposite resin has a melt viscosity, ranging from about 500 to about 1,000 cP, about 1,000 cP to about 1,500 cP, about 1,500 cP to about 2,000 cP, about 2,000 cP to about 2,500 cP, about 2,500 cP, to about 3,000 cP, about 3,000 cP to about 3,500 cP, about 4,000 cP, about 4,000 cP to about 4,500 cP, about 4,500 cP to about 5,000 cP, about 5,000 cP to about 7,000 cP, about 7,000 cP to about 10,000 cP, or about 10,000 cP to about 15,000 cP. In some cases, the melting temperature at which the melt viscosity is measured is between about 115° C. and about 230° C.

Polysaccharide Nanoparticles

Aspects of the present disclosure include a polyester polymer-polysaccharide nanocomposite resin that includes polysaccharide nanoparticles.

Polysaccharides are comprised of multiple saccharide units joined to one another through glycosidic linkages and have a number of unique features that differentiates them from the other families of biopolymers. Polysaccharide materials that find use in the subject nanocomposites can be nanoparticles, i.e., nano-structured forms of a polysaccharide of interest. In some cases, the nanoparticles are crystalline and can be referred to as nanocrystals.

The polyester polymer-polysaccharide resin can be derived from polysaccharide nanoparticles. In some embodiments, the polyester polymer-polysaccharide resin is derived of polysaccharide nanocrystals, and one or more monomers. In some embodiments, the one or more monomers include an alkane diol monomer and an alkane diacid agent monomer.

In some embodiments, the polysaccharide nanocrystals are derived from heparin, chitosan, chitin, hyaluronan, starch, cellulose, alginate, pectin, guar, starch/chitosan, chitosan/heparin, chitosan/hyaluronan, hyaluronan/heparin, or cellulose and chitin whiskers and platelet-like starch. In some embodiments, the polysaccharide nanocrystals are derived from cellulose, starch or chitin.

In some embodiments, the polysaccharide nanocrystals are derived from cellulose. In some embodiments, the polysaccharide nanocrystals are derived from starch. In some embodiments, the polysaccharide nanocrystals are derived from chitin.

In some embodiments, the polysaccharide nanocrystals can be a sphere, rod, disk, or any other shape. In some embodiment, the nanocrystals can have a low size distribution. In some embodiment, the nanocrystals can have a high size distribution.

Cellulose Nanoparticles

The polysaccharide nanoparticles that find use in the nanocomposites of this disclosure can be composed of or derived from cellulose. In some embodiments, the polysaccharide nanocrystals are derived from cellulose. The terms cellulose nanoparticles and nanocellulose are used interchangeably herein. Nanocellulose refers to nano-structured cellulose and can include nanofibers or nonfibrils, nanocrystals or other nano sized structures. Cellulose is a polysaccharide (e.g., of the formula $(C_6H_{10}O_5)_n$) that is composed of a linear chain of β(1→4) linked D-glucose units (e.g., n is 100 to 100,000, such as 500 to 10,000). In some embodiments, the polysaccharide nanocrystals are cellulose nanocrystals. The terms cellulose nanocrystals and nanocellulose crystals (NCC) are used interchangeably herein. An exemplary formula of unmodified cellulose is shown below.

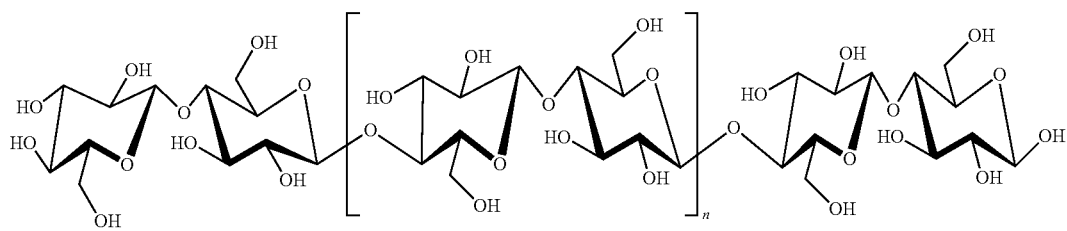

In some embodiments, cellulose nanocrystals, as a subset of cellulose nanoparticles, are highly ordered nano-scale crystals remaining after treatment to remove disordered amorphous regions from nanofibrils (the next member of the cellulose hierarchy).

In some embodiments, the cellulose nanocrystal is a crystal that is derived by subjecting a cellulose fiber to chemical treatment such as acid hydrolysis. In some embodiments, the cellulose nanocrystals are derived from acid hydrolyzed cellulose from cellulosic biomass via an acid hydrolysis technique similar to what was first as first described in Rånby, B. G. (Rånby, B. G. (1951) *Discussion Faraday Society*, 11, 158-164). Nanocellulose crystals (NCC) produced via sulfuric acid treatment and neutralized with base (NaOH in this instance) will contain an amount of sodium sulfate substituent groups that affect dispersibility in hydrophilic mediums.

It is understood that the NCC that find use in the subject nanocomposites can be unmodified or modified, e.g., by incorporation of one or more substituents to replace or derivatize one or more of the three hydroxyl groups of one or more of the glucopyranose repeat unit. In some cases, the NCC is sulfated ($-OSO_3H$). During sulfuric acid hydrolysis of cellulose, starch or chitin, sulfate groups will cover the surface of the nanocrystals. If using hydrochloric acid instead, the sulfate groups (or other substituent) can be attached to the nanocrystal surfaces afterwards by an esterification reaction with sulfuric acid. After HCl or HBr hydrolysis, the NCC may be unmodified. Further modification steps can be performed to add a substituent, e.g., an amine containing group to provide for surface cationization. After $H_3PO_4$ hydrolysis, the NCC may be modified with a phosphate ($-OPO_3H_2$). In some cases, after a HCl/HBr hydrolysis followed by a TEMPO-oxidation, the $-CH2OH$ hydroxyl may be converted to a carboxylic acid.

Exemplary modified units that may be incorporated into glucopyranose repeat units at the surface of a NCC are shown below, where R is any convenient substituent, e.g., alkyl or substituted alkyl, alkanoyl or substituted alkanoyl, or the like.

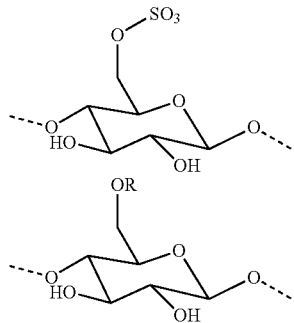

-continued

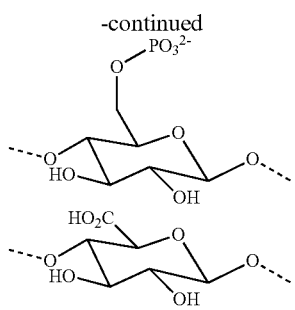

In some embodiments, the cellulose nanocrystals are derived from acid hydrolyzed cellulose from source wood, cotton, bacteria, or algae. In some cases, sulfuric acid is used for acid treatment of the cellulose. NCCs of interest that finds use in the subject methods and compositions includes the NCC described by George et al. ("Cellulose nanocrystals: synthesis, functional properties, and applications", Nanotechnol Sci Appl. 2015; 8: 45-54), the disclosure of which is incorporated by reference.

In some embodiments, NCC generally toughens polybutylene succinate. In some embodiments, additives such as epoxy derivatives or epoxidized oils also toughen polybutylene succinate, but also softens PBS. In some embodiments, using a combination of NCC and epoxidized oil toughens the material but makes it slightly softer.

In some embodiments, the acid hydrolyzed cellulose is obtained from naturally occurring cellulose fibers. In some embodiments, the acid hydrolyzed cellulose is obtained, for example, plant biomass, vascular plants, cotton plants, wood pulp, jute, hemp, corn, flasks, rice, wheat straw, or sisal. In some embodiments, the cellulose is obtained from plant biomass, which includes, but is not limited to trees, grasses, cotton, sisal, bamboo and ramie.

In some embodiments, cellulose nanocrystals can be found as structural components in tunicates (sea creature similar to sea cucumbers), and are produced naturally by the *Acetobacter xylinum* bacteria.

In some embodiments, the cellulose nanocrystals have average dimensions of about 1 to 80 nm in width and about 25 to 1000 nm in length. In some embodiments, the cellulose nanocrystals have average dimensions ranging from about 1 to 100 nm in width and a length ranging from about 25 to 3000 nm. In some embodiments, the cellulose nanocrystals have average dimensions of about 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, 95 nm or more, or 100 nm or more in width; and 25 nm or more, 50 nm or more, 100 nm or more, 150 nm or more, 200 nm or more, 250 nm or more, 300 nm or more, 350 nm or more, 400 nm or more, 500 nm or more, 550 nm or more, 600 nm or more, 650 nm or more, 700 nm or more, 800 nm or more, 850 nm or more, 900 nm or more, 950 nm or more, 1000 nm or more, 1500 nm or more, 2000 nm or more, 2500 nm or more, or 3000 nm or more, in length.

In some embodiments, the cellulose nanocrystals have average dimensions of about 3 to 50 nm in width and about 100 to 1000 nm in length.

In some embodiments, the cellulose nanocrystals have an average aspect ratio (length/diameter) that is 10 or great, such as 20 or greater, 30 or greater, 40 or greater, 50 or greater, 60 or greater, 70 or greater, 80 or greater, 90 or greater, 100 or greater, 150 or greater, 200 or greater, or even greater. In some embodiments, the cellulose nanocrystals have an average aspect ratio (length/diameter) that is between 10 and 200, such as between 20 and 200, between 50 and 200, or between 100 and 200.

In some embodiments, the nanocrystals in the dispersion have a particle size distribution ranging from about 1 d·nm to about 400 d·nm. In some embodiments, the nanocrystals in the dispersion have a particle size distribution ranging from about 1 d·nm to about 50 d·nm, about 50 d·nm to about 100 d·nm, about 100 d·nm to about 150 d·nm, about 150 d·nm to about 200 d·nm, 200 d·nm to about 250 d·nm, 250 d·nm to about 300 d·nm, 300 d·nm to about 350 d·nm, 350 d·nm to about 400 d·nm. In some embodiments, the nanocrystals in the dispersion have a particle size distribution ranging from about 1 d·nm to about 20 d·nm. In some embodiments, the nanocrystals in the dispersion have a particle size distribution ranging from about 10 d·nm to about 100 d·nm. In some embodiments, the nanocrystals in the dispersion have a particle size distribution ranging from about 10 d·nm to about 30 d·nm. In some embodiments, the nanocrystals in the dispersion have a particle size distribution ranging from about 100 d·nm to about 200 d·nm. In some embodiments, the nanocrystals in the dispersion have a particle size distribution of 1 d·nm or more, 2 d·nm or more, 4 d·nm or more, 6 d·nm or more, 8 d·nm or more, 10 d·nm or more, 12 d·nm or more, 14 d·nm or more, 16 d·nm or more, 18 d·nm or more, 20 d·nm or more, 22 d·nm or more, 24 d·nm or more, 26 d·nm or more, 28 d·nm or more, 30 d·nm or more, 32 d·nm or more, 34 d·nm or more, 36 d·nm or more, 38 d·nm or more, 40 d·nm or more, 42 d·nm or more, 44 d·nm or more, 46 d·nm or more, 48 d·nm or more, 50 d·nm or more, 52 d·nm or more, 54 d·nm or more, 56 d·nm or more, 58 d·nm or more, 60 d·nm or more, 62 d·nm or more, 64 d·nm or more, 66 d·nm or more, 68 d·nm or more, 70 d·nm or more, 72 d·nm or more, 74 d·nm or more, 76 d·nm or more, 78 d·nm or more, 80 d·nm or more, 82 d·nm or more, 84 d·nm or more, 86 d·nm or more, 88 d·nm or more, 90 d·nm or more, 92 d·nm or more, 94 d·nm or more, 96 d·nm or more, 98 d·nm or more, or 100 d·nm or more. In some embodiments, the nanocrystals in the dispersion have a particle size distribution of 100 d·nm or more, 125 d·nm or more, 150 d·nm or more, 175 d·nm or more, 200 d·nm or more, 225 d·nm or more, 250 d·nm or more, 275 d·nm or more, 300 d·nm or more, 325 d·nm or more, 350 d·nm or more, 400 d·nm or more, 425 d·nm or more, 500 d·nm or more, 525 d·nm or more, 550 d·nm or more, 575 d·nm or more, 600 d·nm or more, 625 d·nm or more, 650 d·nm or more, 675 d·nm or more, 700 d·nm or more, 725 d·nm or more, 750 d·nm or more, 775 d·nm or more, 800 d·nm or more, 825 d·nm or more, 850 d·nm or more, 875 d·nm or more, 900 d·nm or more, 925 d·nm or more, 950 d·nm or more, 975 d·nm or more, or 1000 d·nm or more.

In some embodiments, increasing the length of the cellulose nanocrystals increases load distribution potential throughout the polymer. In some embodiments, as orientation of the cellulose nanocrystals within the polymer increases the interfacial contact between adjacent cellulose nanocrystals in the axial orientation, where ultimate tensile strength can be increased. In some embodiments, in the transverse direction, Cellulose nanocrystal morphology (e.g., length, aspect ratio, length polydispersity) and surface charge vary greatly based on synthesis conditions. In some embodiments, acid hydrolysis is used to break down cellulose microfibrils by digesting the amorphous regions that connect cellulose nanocrystals. In some embodiments, process typically requires heating, agitation, rinsing, filtration, dialysis, and ultrasonication, with the parameters of each step having a direct impact on cellulose nanocrystal morphology and/or surface chemistry. In some embodiments, the final result of cellulose nanocrystal processing includes a suspension of liquid crystalline cellulose nanocrystals that is produced, forming either a nematic or chiral nematic mesophase (e.g., dependent on cellulose nanocrystal length, aspect ratio, length polydispersity, surface charge, nano crystalline cellulose (NCC) concentration, and electrolyte concentration).

In some embodiments, the cellulose nanocrystals enhance one or more mechanical properties of the polymer base resin. Non-limiting properties that may be improved through the incorporation of cellulose nanoparticles in the base polymer resin may be selected from at least one of the following: modulus of elasticity, tensile yield stress, hoop stress rating, flexural modulus, UV resistance, and reduced rate of gas transmission. The present disclosure therefore allows a measurable enhancement in performance to be achieved without a significant loss of other desirable characteristics, such as tensile strength, ultimate elongation, melt index, thermal stability, impact strength, slow crack growth resistance and rapid crack propagation resistance.

Aspects of the subject disclosure include preparation of nanocomposites where the polymer chains can be grafted to the polysaccharide nanoparticles, such as cellulose nanocrystals, e.g., via ester linkages to hydroxyl groups of the polysaccharide.

Polyester Polymers

The nanocomposites of this disclosure are based on polyester polymers. The term polyester polymer refers to a polymer that includes a plurality of repeating units that are linked via ester linkages. In some embodiments, the ester linkage is formed between an aliphatic diol co-monomer and an aliphatic diacid co-monomer. The polyester polymers of the subject nanocomposites can be biodegradable. The exact components of the polyester polymers can be selected to provide for desirable properties in the resulting nanocomposite.

The term "unit" refers to a structural subunit of a polymer. The term unit is meant to include monomers, co-monomers, co-blocks, segments, repeating units, and the like. A "repeating unit" is a subunit of a polymer that is defined by the minimum number of distinct structural features that are required for the unit to be considered monomeric, such that when the unit is repeated n times, the resulting structure describes the polymer or a block thereof. In some cases, the polymer may include two or more different repeating units, e.g., when the polymer is a multiblock polymer, each block may define a distinct repeating unit. In some cases, a repeating unit of the polymer includes a single monomer group. In certain instances, a repeating unit of the polymer includes two or more monomer groups, i.e., co-monomer groups, such as two, three, four or more co-monomer groups.

The term "co-monomer" or "co-monomer group" refers to a structural unit of a polymer that may itself be part of a repeating unit of the polymer. In some embodiments, the polyester polymer includes a block copolymer that is composed of blocks of polymerized monomers. In such cases, the block copolymer may be described as having distinct repeating units each corresponding to a distinct co-block of the polymer. In some cases, the polymer is a diblock copolymer that contains two different co-blocks. In such cases, the polymer may be described as including co-blocks, where each co-block may be composed of co-monomers, such as one, two, three or more co-monomers.

In some embodiments, the nanocomposite includes a polyester polymer comprising a repeat unit of formula (I):

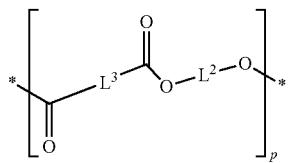

where:
L$^1$ and L$^2$ are each independently a linking group of 2-12 atoms in length;
p is 1 to 100,000; and
each * independently represents H, OH, alkyl, alkoxy, alkanoyl, aroyl, heteroaroyl, aryloxy, heteroaryloxy, a capping group, a co-polymer segment, a repeat unit, a co-monomer, a grafted polysaccharide nanoparticle, a linker, a crosslinker, or an epoxidized oil, epoxy derivative or fatty acid.

L$^1$ and L$^2$ can be any convenient divalent linking groups having a chain of between 2 and 12 atoms in length, for example a chain of 2, 3, 4, 5, 6, 8, 10, or 12 carbon atoms in length, where the linker may be linear, branched, or cyclic. In certain cases, one, two, three, four or five or more carbon atoms of a linking group backbone may be optionally substituted with a sulfur, nitrogen or oxygen heteroatom. The bonds between backbone atoms may be saturated or unsaturated (e.g., alkenyl), and in some cases not more than one, two, or three unsaturated bonds are present in a linker backbone. The linker may include one or more substituent groups, for example with an alkyl, aryl or alkenyl group. A linker may include, without limitations, polyethylene glycol; ethers, thioethers, tertiary amines, alkenyls, alkyls, which may be straight or branched, e.g., methyl, ethyl, n-propyl, 1-methylethyl (isopropyl), nbutyl, n-pentyl, 1,1-dimethylethyl (t-butyl), and the like. In some embodiments of formula (I), L$^1$ and L$^2$ are each independently selected from alkyl, substituted alkyl, alkenyl, substituted alkenyl.

"Alkylene" refers to divalent aliphatic hydrocarbyl groups (e.g., alkyl or alkenyl), preferably having from 2 to 12 and more preferably 2 to 6 carbon atoms that are either straight-chained or branched, and which are optionally interrupted with one or more groups selected from —O—, —NR10-, NR10C(O)—, —C(O)NR10- and the like. This term includes, by way of example, methylene (CH2), ethylene (CH2CH2), n-propylene (CH2CH2CH2), iso-propylene (CH2CH(CH3)), (C(CH3)2CH2CH2), (C(CH3)2CH2C(O)), (C(CH3)2CH2C(O)NH), (CH(CH3)CH2-), and the like. "Substituted alkylene" refers to an alkylene group having from 1 to 3 hydrogens replaced with substituent groups.

In some embodiments of formula (I), p is 2 to 100,000. In some embodiments of formula (I), p is 5 to 100,000. In some embodiments of formula (I), p is 10 to 100,000. In some embodiments of formula (I), p is 100 to 100,000. In some embodiments of formula (I), p is 1000 to 100,000.

In some embodiments of formula (I), p is 2 to 10,000. In some embodiments of formula (I), p is 5 to 10,000. In some embodiments of formula (I), p is 10 to 10,000. In some embodiments of formula (I), p is 100 to 10,000. In some embodiments of formula (I), p is 1000 to 10,000. In some embodiments of formula (I), p is 2 to 1,000. In some embodiments of formula (II), p is 5 to 1,000. In some embodiments of formula (I), p is 10 to 1,000. In some embodiments of formula (I), p is 100 to 1000.

Any convenient polymers, and/or their monomeric precursors, may be adapted to be incorporated into the subject preparation methods to provide a nanocomposite composition having desirable physical properties (e.g., as described herein, such as tensile strength). Polymers of interest, and monomeric precursors thereof, that may be adapted for use in the subject preparation methods and nanocomposite compositions include, but are not limited to, those polymers and monomers described by Zheng et al. (Ind. Eng. Chem. Res. 2013, 52, 6147-6155), Tserki et al. (Polymer Degradation and Stability, Volume 91, Issue 2, February 2006, 367-376), US20190194400, and U.S. Pat. No. 9,796,849, the disclosures of which are herein incorporated by reference in their entirety.

In some aspects, the polyester polymer-polysaccharide nanocomposite resin is derived from a mixture that includes polysaccharide nanocrystals, an alkane diol monomer, and an alkane diacid agent monomer. Aspects of the subject disclosure include preparation of nanocomposites via a polymerization reaction where the polysaccharide nanoparticles, such as cellulose nanocrystals, are present during polymerization to allow for grafting of the polymer chains onto the polysaccharide, e.g., via ester linkages to hydroxyl groups of the polysaccharide.

In some embodiments, the polysaccharide nanocrystals, the alkane diol monomer, and the alkane diacid agent monomer are polycondensed in a dispersion to produce a polyester polymer-polysaccharide nanocomposite resin.

In some embodiments, the polyester polymer of the polymer-polysaccharide nanocomposite resin is an aliphatic polyester polymer. In some cases, the polyester polymer is biodegradable. In some embodiments, the polymer includes a polybutylene succinate homopolymer or co-polymer. In some embodiments, the polymer includes poly(butylene succinate-co-butylene adipate).

The polyester polymer can include one or more additional co-monomers that are incorporated into the polymer to provide for a particular desirable property.

In some embodiments, the aliphatic polyester polymer can include, but is not limited to, a segment of a particular aliphatic polyester polymer selected from polylactide (PLA) (e.g., poly(lactic acid)), polyglycolide (PGA) (e.g., Polyglycolic acid), poly(ε-caprolactone) (PCL), poly(γ-valerolactone) (PVL), and co-polymer poly(lactic-co-glycolic acid) (PLGA).

PLA is a biodegradable and hydrophobic polymer synthesized from lactic acid.

PCL is a semicrystalline polyester, typically with a melting temperature of about 55-60° C.

PGA is a highly crystalline polymer, typically with a melting point greater than 200° C. and a glass transition temperature around 35-40° C.

PLGA can be fabricated over different ratios of its monomers, lactide and glycolide, enabling tunable degradation and release rates.

In some embodiments, the nanocomposite includes a polyester polymer comprising a repeat unit of formula (II):

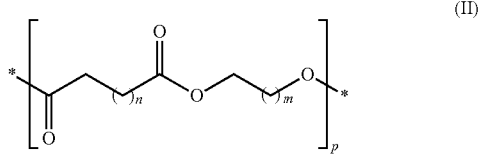

(II)

where:
n is 1 to 11;
m is 1 to 11;
p is 1 to 100,000; and
each * independently represents H, OH, alkyl, alkoxy, alkanoyl, aroyl, heteroaroyl, aryloxy, heteroaryloxy, a capping group, a co-polymer segment, a repeat unit, a co-monomer, a grafted polysaccharide nanoparticle, a linker, a crosslinker, or an epoxidized oil, epoxy derivative or fatty acid.

In some embodiments of formula (II), n is 1 to 5 and m is 1 to 5.

In some embodiments of formula (II), n is 1. In some embodiments of formula (II), n is 2. In some embodiments of formula (II), n is 3. In some embodiments of formula (II), n is 4. In some embodiments of formula (II), n is 5.

In some embodiments of formula (II), m is 2 to 5. In some embodiments of formula (II), m is 2. In some embodiments of formula (II), m is 3. In some embodiments of formula (II), m is 4. In some embodiments of formula (II), m is 5.

In some embodiments of formula (II), n is 1 and m is 3.

In some embodiments of formula (II), p is 2 to 100,000. In some embodiments of formula (II), p is 5 to 100,000. In some embodiments of formula (II), p is 10 to 100,000. In some embodiments of formula (II), p is 100 to 100,000. In some embodiments of formula (II), p is 1000 to 100,000.

In some embodiments of formula (II), p is 2 to 10,000. In some embodiments of formula (II), p is 5 to 10,000. In some embodiments of formula (II), p is 10 to 10,000. In some embodiments of formula (II), p is 100 to 10,000. In some embodiments of formula (II), p is 1000 to 10,000.

In some embodiments of formula (II), p is 2 to 1,000. In some embodiments of formula (II), p is 5 to 1,000. In some embodiments of formula (II), p is 10 to 1,000. In some embodiments of formula (II), p is 100 to 1000.

In some embodiments of formula (I)-(II), at least one * represents a grafted polysaccharide nanoparticle. In some embodiments of formula (I)-(II), at least one * represents a grafted cellulose nanoparticle. In some embodiments of formula (I)-(II), at least one * represents a grafted cellulose nanocrystal.

In some embodiments of formula (I)-(II), at least one * represents a capping group. A capping group is a group comprising a compatible functional group suitable for attachment to a hydroxy terminal or carboxylic acid terminal of the polymeric segment. Exemplary capping groups include alkanoyl groups that form an ester linkage to the hydroxy terminal, and alkoxy groups that form an ester linkage to the carboxylic acid terminal. A variety of chemical linkages and capping groups can be utilized. In some embodiments of formula (I)-(II), at least one * represents a linkage to an epoxidized oil, epoxy derivative or fatty acid.

An epoxidized oil can have one or more epoxide groups suitable for coupling to a reactive group of the polyester polymer, e.g., a terminal group such as a carboxylic acid to form an ester linkage to the epoxidized oil, or a terminal groups such as a hydroxyl to form an ether linkage. When the epoxidized oil has more that one epoxide reactive group, it can provide for crosslinking between two or more polyester polymers. In some cases, a fatty acid can be used to cap the polyester polymer via an ester linkage to a hydroxyl terminal group.

In some embodiments of formula (I)-(II), at least one * represents a co-monomer, a co-polymer segment, or a repeat unit (e.g., as described herein), such that the polyester polymer is a co-polymer (e.g., as described herein). It is understood that such a co-polymer can be a random co-polymer or a block co-polymer.

In some aspects, the polyester polymer-polysaccharide nanocomposite resin includes polymer repeat units based on a diol monomer HO-L²-OH where $L^2$ is as defined in formula (I). In some cases, $L^2$ is an alkyl or substituted alkyl. In some cases, $L^2$ is an alkenyl or substituted alkenyl.

Alkane Diol Monomers

In some aspects, the polyester polymer-polysaccharide nanocomposite resin includes polymer repeat units based on an alkane diol monomer. The alkane diol monomer refers to a straight chain or branched alkyl group having terminal hydroxyl groups (e.g., HO-alkyl-OH). The alkane diol monomer can have a chain of C2 to C12 linking the terminal hydroxyl groups. The alkane diol monomer can be unsubstituted, or substituted with one or more substituents. In some embodiments, the alkyl group includes from 1 to 10 carbon atoms. In certain embodiments, an alkyl group includes from 1 to 6 carbon atoms, such as from 1 to 4 carbon atoms. This term includes, by way of example, linear and branched hydrocarbyl groups such as ethyl (CH3CH2), n-propyl (CH3CH2CH2-), isopropyl ((CH3)2CH—), n-butyl (CH3CH2CH2CH2), isobutyl ((CH3)2CHCH2), sec-butyl ((CH3)(CH3CH2)CH—), t-butyl ((CH3)3C—), n-pentyl (CH3CH2CH2CH2CH2-), and neopentyl ((CH3)3CCH2-).

The term "substituted alkyl" refers to an alkyl group as defined herein wherein one or more carbon atoms in the alkyl chain have been optionally replaced with a heteroatom such as O—, N—, S—, —S(O)n- (where n is 0 to 2), —NR— (where R is hydrogen or alkyl) and having from 1 to 5 substituents selected from the group consisting of alkoxy, substituted alkoxy, cycloalkyl, substituted cycloalkyl, cycloalkenyl, substituted cycloalkenyl, acyl, acylamino, acyloxy, amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-aryl, —SO-heteroaryl, —SO2-alkyl, —SO2-aryl, SO2-heteroaryl, and —NRaRb, wherein Ra and Rb may be the same or different and are chosen from hydrogen, optionally substituted alkyl, cycloalkyl, alkenyl, cycloalkenyl, alkynyl, aryl, heteroaryl and heterocyclic.

In some embodiments, the alkane diol monomer is selected from a 1,4-butanediol monomer, a 1,2-ethanediol monomer, a 1,3-propanediol monomer, a 1,5-pentanediol monomer, or a 1,6-hexanediol monomer.

In some embodiments, the alkane diol monomer includes one or more diols to form a polyester composite. Non-limiting examples of other suitable diols include, but are not limited to, ethylene glycol, 1,3-propylene glycol, neopentyl glycol, 1,6-hexamethylene glycol, 1,4-cyclohexanedimethanol, hydroquinone, 1.5-dihydroxynaphthalene, 4,4'-dihydroxydiphenyl, bis(p-hydroxyphenyl)methane, bis(p-hydroxyphenyl)-2.2-propane, and combinations thereof.

In some embodiments, the alkane diol monomer 1,4-butanediol.

In some embodiments, the alkane diol monomer is 1,2-ethanediol.

In some embodiments, the alkane diol monomer is 1,3-propanediol.

In some embodiments, one or more additional components may be added or substituted with 1,4-butanediol with one or more other diols to form a polyester composite.

Non-limiting examples of other suitable diols include, but are not limited to, ethylene glycol, 1,3-propylene glycol, neopentyl glycol, 1,6-hexamethylene glycol, 1,4-cyclohexanedimethanol, hydroquinone, 1.5-dihydroxynaphthalene, 4,4'-dihydroxydiphenyl, bis(p-hydroxyphenyl)methane, bis(p-hydroxyphenyl)-2.2-propane, and combinations thereof.

In some embodiments, a polyether having hydroxyl end groups may be used in combination with the diols of the present disclosure. In some embodiments, as the polyether having hydroxyl end groups, the carbon number has a lower limit of usually 4 or more, 10 or more and an upper limit of usually 1,000 or less, 200 or less, more 100 or less. Non-limiting examples of the polyether having hydroxyl end groups include, but are not limited to, diethylene glycol, triethylene glycol, polyethylene glycol, polypropylene glycol, polytetramethylene glycol, poly-1,6-hexamethylene glycol, and the like. Moreover, copolymerized polyether of polyethylene glycol and polypropylene glycol, and the like can be also used.

Alkane Diacid Agent Monomer

The polyester polymer-polysaccharide nanocomposite includes polymer repeat units based on an diacid agent monomer (e.g., of the formula $HO_2C-L^1-CO_2H$ or a derivative or equivalent thereof, where $L^1$ is as defined in formula (I)). The polyester polymer-polysaccharide nanocomposite includes polymer repeat units based on an alkane diacid agent monomer. The alkane diacid agent monomer refers to a straight chain or branched alkyl group having terminal hydroxyl groups. The alkane diacid monomer can have an alkyl chain of C2 to C12 linking the terminal carboxylic acid or ester groups, or equivalent functional group. The alkane diacid agent monomer can be unsubstituted, or substituted with one or more substituents. In some embodiments, the alkyl group includes from 1 to 10 carbon atoms. In certain embodiments, an alkyl group includes from 1 to 6 carbon atoms, such as from 1 to 4 carbon atoms. It is understood that the diacid groups of the monomer are typically provided in a derivative form suitable for polymerization with a hydroxyl containing co-monomer. In some embodiments, where the alkane diacid agent monomer is provided in an ester or cyclic anhydride form, the monomer is capable of transesterification with a hydroxyl containing monomer, e.g., an alkane diol monomer.

In some embodiments, the alkane diacid agent monomer is selected from succinic acid, monoalkyl succinate, dialkyl succinate (e.g., dimethyl succinate or diethyl succinate), succinic anhydride, adipic acid, monoalkyl adipate, dialkyl adipate (e.g., dimethyl adipate or diethyl adipate), and adipic anhydride.

In some embodiments, the alkane diacid agent monomer is selected from oxalic acid, malonic acid, succinic acid, glutaric acid, adipic acid, suberic acid, sebacic acid, cyclohexanedicarboxylic acid, and their cyclic acid anhydride equivalents. In certain embodiments the succinate derivative is substituted with or added to one or more additional components. In some embodiments, these one or more additional components include one or more dicarboxylic acids or anhydrides. Non-limiting examples include, but are not limited to, fumaric acid, oxalic acid, malonic acid, succinic acid, glutaric acid, adipic acid, suberic acid, sebacic acid, cyclohexanedicarboxylic acid, and their cyclic acid anhydride equivalents.

In some embodiments, the polyester polymer includes repeat units based on an aliphatic diacid agent co-monomer (e.g., as described herein). In certain embodiments, the aliphatic diacid agent co-monomer is fumaric acid.

Polybutylene Succinate or Fumarate Polymers and Co-Polymers

In some aspects, the polyester polymer-polysaccharide nanocomposite resin includes polysaccharide nanocrystals, an alkane diol monomer, and an diacid agent monomer.

In some embodiments, the alkane diol monomer is a 1,4-butanediol monomer. In some embodiments, the alkane diacid agent monomer is a succinic acid agent monomer. In some embodiments, alkane diacid agent monomer is succinic anhydride.

Aliphatic homopolyesters and copolyesters can be prepared from 1,4 butanediol and succinic acid agent monomer (e.g., succinic anhydride or dimethylesters of succinic acid) and optionally one or more other co-monomers (e.g., as described herein) through a two-step process of transesterification and polycondensation. Similarly, an alkenyl diacid monomer such as fumaric acid monomer, e.g., maleic anhydride, can be utilized with a 1,4-butanediol monomer to produce a polybutylene fumarate (PBF) homopolymer or co-polymer for use in the subject nanocomposites.

In some embodiments, a mixture including the polysaccharide nanocrystals, the 1,4-butanediol monomer, and the succinic acid agent monomer (optionally in the presence of one or more additional co-monomers) are polycondensed in a dispersion to produce the polymer-polysaccharide nanocomposite resin.

In some embodiments, the polymer of the polymer-polysaccharide nanocomposite resin is polybutylene succinate (PBS) homopolymer or polybutylene succinate copolymer.

In some embodiments, the polymer of the polymer-polysaccharide nanocomposite resin is polybutylene succinate copolymer.

In some embodiments, the polybutylene succinate copolymer is butylene fumarate or polymeric blends of PBS and polybutylene fumarate (PBF). In some embodiments, the polybutylene succinate copolymer is represented by the formula (III):

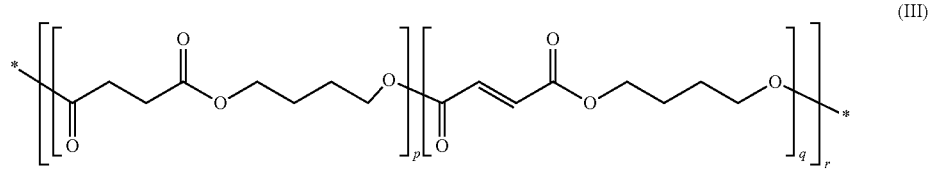

where p, q and r are independently 1 to 100,000, and each * independently represents H, OH, alkyl, alkoxy, alkanoyl, aroyl, heteroaroyl, aryloxy, heteroaryloxy, a capping group, a co-polymer segment, a repeat unit, a co-monomer, a grafted polysaccharide nanoparticle, a linker, a crosslinker, or an epoxidized oil, epoxy derivative or fatty acid.

In some embodiments of formula (III), p and q are independently 2 to 100,000. In some embodiments of formula (III), p and q are independently 5 to 100,000. In some embodiments of formula (III), p and q are independently 10 to 100,000. In some embodiments of formula (III), p and q are independently 100 to 100,000. In some embodiments of formula (III), p and q are independently 1000 to 100,000.

In some embodiments of formula (III), p and q are independently 2 to 10,000. In some embodiments of formula (III), p and q are independently 5 to 10,000. In some embodiments of formula (III), p and q are independently 10 to 10,000. In some embodiments of formula (III), p and q are independently 100 to 10,000. In some embodiments of formula (III), p and q are independently 1000 to 10,000. In some embodiments of formula (III), p and q are independently 2 to 1,000. In some embodiments of formula (III), p and q are independently 5 to 1,000. In some embodiments of formula (III), p and q are independently 10 to 1,000. In some embodiments of formula (III), p and q are independently 100 to 1000.

In some embodiments of formula (III), r is 1 to 10,000. In some embodiments of formula (III), r is 1 to 1,000. In some embodiments of formula (III), r is 1 to 100. In some embodiments of formula (III), r is 1 to 10.

It is understood that the polybutylene succinate copolymer may include any convenient configuration of co-monomers, such as a co-block or random configuration. In some embodiments, the polybutylene succinate copolymer is represented by the formula (IV):

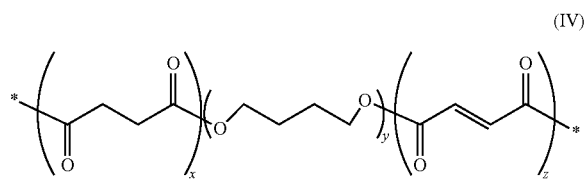

where x, y and z represent the mol % of the co-monomer in the polymer.

In some embodiments, x, y and z are each independently 1 to 50 mol %. In some cases, y is x+z. In some embodiments, x>z. In some embodiments, z>x.

In some embodiments, the polybutylene succinate copolymer has an average MW of 10 kDa to 100 kDa, such as 10 kDa to 50 kDa or 20 kDa to 40 kDa.

In some embodiments, adding the fumarate moiety extends the crystalline melting temperature of PBS up to 10° C. to 15° C. For example, PBS has a melting temperature of about 115° C., which might hinder its processability in the melt, in yarn/fabric production, as well as yarn/fabric application. Pure PBF has a melting temperature of around 139° C. In some embodiments, PBF acts as a polymeric nucleating agent when compounded with succinate derived polyesters and enhances crystallization kinetics.

In some embodiments, the polybutylene succinate copolymer is diethyleneglycolsuccinate. In some embodiments, the diethylene glycol (DEG) may be substituted with triethylene glycol, 1,3 propanediol, sorbitol, or xylitol. In some embodiments, introduction of hydrophilic backbone creates a better substrate for certain bacteria and fungi to adhere to, allowing aerobic/anaerobic degradation processes to occur. In some embodiments, introduction of asymmetrical backbone reduces crystallinity and improves biodegradability. PBS is hydrophobic and highly crystalline, which limits how readily it will degrade in certain aquatic and terrestrial environments.

In some embodiments, the polybutylene succinate copolymer is polypropyleneoxide succinate. Introduction of poly (1,3propyleneoxide) polyol allows for a phase separated soft segment to form in the copolymer, creating a thermoplastic polyester elastomer (TPPE). Polyol molecular weights may range from 500-2700 g/mol. In some embodiments, polytetramethyleneoxide (PTMO) or polyethyleneglycol (PEG) polyols of similar molecular weights may also be used. In some embodiments, fumaric acid may be included in the copolymer. In some embodiments, fumaric acid may be introduced to increase crystallinity and induce better phase separation of hard (PBS) and soft (PPOS) segments.

In some embodiments, the polybutylene succinate copolymer is a phenylethylene succinate. In some embodiments, the tyrosol can be substituted with a homovanillyl alcohol, coniferyl alcohol, or vanillyl alcohol. For example, introduction of naturally occurring aryl hydroxy acids increases strength and durability of polybutylene succinate.

In some embodiments, the polybutylene succinate copolymer is a butylene coumarate. In some embodiments, the p-coumaric acid is substituted with ferulic acid, phloretic acid, syringic acid, sinapic acid, or caffeic acid. For example, introduction of hydroxy cinnamic acid derivatives increases the strength and melting point of PBS.

Succinic Acid Agent Monomer

In some embodiments, the alkane diacid agent monomer is a succinic acid agent monomer or derivative thereof. In some embodiments, the alkane diacid agent monomer is a succinic acid agent monomer. In some embodiments, the succinic acid agent is succinic anhydride.

In some embodiments, the succinic acid agent monomer includes, but is not limited to, a succinic acid agent selected from succinic acid, monoalkyl succinate, dialkyl succinate (e.g., dimethyl succinate or diethyl succinate), or succinic anhydride.

In some embodiments, the succinate acid agent is a succinate derivative. In some embodiments, the succinate derivative is succinate anhydride. In some embodiments, the succinate anhydride increases the speed of esterification with 1,4 butanediol and also reduces the amount of hazardous THF produced during the esterification step. However, other suitable non-limiting examples of succinate derivatives may include succinic acid or succinate esters.

Additives

In some aspects, the polymer-polysaccharide nanocomposite resin includes one or more additional monomers and/or capping agents.

In some embodiments, the polymer polysaccharide nanocomposite includes one or more additional monomers, such as, but not limited to, co-monomers, epoxy-derivatives, oils, pigments, cross-linkers, and the like.

In some embodiments, the one or more additional monomers includes an additional alkane diol monomer and/or an additional diacid agent monomer.

In some embodiments, an additional alkane diol monomer includes, but is not limited to, a 1,4-butanediol monomer, a 1,2-ethanediol monomer, a 1,3-propanediol monomer, a 1,5-pentanediol monomer, or a 1,6-hexanediol monomer.

In some embodiments, an additional diacid agent monomer includes, but is not limited to succinic acid, monoalkyl succinate, dialkyl succinate (e.g., dimethyl succinate or diethyl succinate), succinic anhydride, adipic acid, monoalkyl adipate, dialkyl adipate (e.g., dimethyl adipate or diethyl adipate), and adipic anhydride.

In some embodiments, the additional alkane diacid agent monomer includes adipic anhydride.

In some embodiments, the one or more additional components can include a hydrophobic agent. In some embodiments, the hydrophobic agent is an oil. In some embodiments, the hydrophobic agent is an elastomer material. In some embodiments, the hydrophobic agent is an epoxidized soybean oil or elastomer material.

In some embodiments, the one or more additional components include, but are not limited to agents to provide additional water and oxygen barrier properties may be included. Non-limiting exemplary water and oxygen barrier agents include candelilla wax, beeswax, and other waxes. In some embodiments, such a barrier agent is derived from a renewable source.

In some embodiments, the one or more additional component is a non-covalent plasticizer. Plasticizers are additives that are used to impart flexibility to polymer blends and improve their processability. Any known non-covalent plasticizer may be included as one or more additional components.

In some embodiments, one or more additional components include gloss agents that provide an aesthetically pleasing gloss to a finished product. Non-limiting exemplary gloss agents include shea butter and nut oils, such as Brazil nut oil. In some embodiments, a gloss agent is derived from a renewable source.

In some embodiments, the one or more additional components include, but are not limited to impact modifiers, antioxidants, antibacterial agents, antifungal agents, antistatic agents, fillers, thermal stabilizers, UV stabilizers, dyes, fillers, crystallizing promoters and coupling agents.

Non-limiting examples of antioxidants include hindered phenol antioxidants, such as p-tert-butyl hydroxytoluene and p-tert-butyl hydroxyanisole, sulfur antioxidants such as distearyl thiodipropionate and dilauryl thiodipropionate, and the like; heat stabilizers include triphenyl phosphite, trilauryl phosphite, tris-nonylphenyl phosphite and the like; UV stabilizers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmitate and the like; antistatic agents include N,N-bis(hydroxyethyl) alkyl amine, alkyl amine, alkyl allyl sulfonate, alkyl sulfonate and the like; flame retarders include hexabromocyclododecane, tris-(2,3-dichloropropyl) phosphate, pentabromophenyl allyl ether and the like; anti-blocking agents include the combination of inorganic fillers such as silica and oleamide and the like; inorganic fillers or nucleating agents include calcium carbonate, silica, titanium oxide, talc, mica, barium sulfate, alumina, mixture of NaHCO3 and citric acid and the like; crystallizing promoters include polyethylene terephthalate, poly-transcyclohexane dimethanol terephthalate and the like; organic fillers include wood powder, rice hull, wastepaper such as newspaper, starches (including modified materials such as alpha-starch), cellulose and the like.

In some embodiments, a polyether having hydroxyl end groups may be used in combination with the diols disclosed in the present disclosure. As the polyether having hydroxyl end groups, the carbon number has a lower limit of usually 4 or more, preferably 10 or more and an upper limit of usually 1,000 or less, preferably 200 or less, more preferably 100 or less. Non-limiting examples of the polyether having hydroxyl end groups include, but are not limited to diethylene glycol, triethylene glycol, polyethylene glycol, polypropylene glycol, polytetramethylene glycol, poly-1,6-hexamethylene glycol, and the like. Moreover, copolymerized polyether of polyethylene glycol and polypropylene glycol, and the like can be also used.

In some embodiments, the one or more additional monomers includes one or more dicarboxylic acids or anhydrides. Non-limiting examples may include, but are not limited to oxalic acid, malonic acid, succinic acid, glutaric acid, adipic acid, suberic acid, sebacic acid, cyclohexanedicarboxylic acid, and their cyclic acid anhydride equivalents.

In some embodiments, the one or more additional monomers include an epoxidized oil, epoxy derivative or fatty acid. In some embodiments, the epoxidized oil, epoxy derivative or fatty acid are capable of esterification. In some embodiments, the epoxy derivative or epoxidized oil is added at the end of the reaction. For example, in some embodiments, the epoxy derivative or epoxidized can be added after re-pressurizing the vessel just before the cool down and discharging of the polymer. In some embodiments, NCCs, expoxy derivative, and/or epoxidized oil can be added up front with the alkane diol monomer and/or alkane diacid agent monomer. For example, in some embodiments, the NCCs can be added in the beginning of the reaction in the form of a dispersion. In some embodiments, the epoxy derivative or epoxidized oil is added at the very end of the esterification process right before the catalyst is added and the polycondensation takes place. In some examples, the epoxy derivative or epoxidized oil is allowed to react for 5 minutes before adding the catalyst. The high shear disperser method follows the same process as the sonication method for time and power consumption, but instead uses the equipment described in https://www(dot)mixers(dot)com/products/high-speed-dispersers/.

In some embodiments, the one or more additional monomers is an epoxidized oil. In some embodiments, the one or more additional monomers is an epoxidized derivative. In some embodiments, the epoxidized oil or an epoxy derivative includes, but is not limited to epoxidized linseed oil, as epoxidized linseed oil, lard, beef tallow, fish oil, coffee oil, soybean oil, safflower oil, tung oil, tall oil, calendula, rapeseed oil, peanut oil, sesame oil, grape seed oil, olive oil, jojoba oil, dehydrated castor oil, tallow oil, sunflower oil, cottonseed oil, corn oil, canola oil, orange oil, and mixtures thereof.

In some embodiments, the one or more additional monomers includes a catalyst.

Non-limiting exemplary catalysts include, but are not limited to titanium or zirconium compounds, such as titanium lactate or zirconium butoxide. In general, a compound containing at least one member among metal elements belong to the groups 1 to 14 of the periodic table may be used as the esterification reaction catalyst. Specifically, examples of the metal element include scandium, yttrium, samarium, titanium, zirconium, vanadium, chromium, molybdenum, tungsten, tin, antimony, cerium, germanium, zinc, cobalt, manganese, iron, aluminum, magnesium, calcium, strontium, sodium, potassium, and the like. Of these, scandium, yttrium, titanium, zirconium, vanadium, molybdenum, tungsten, zinc, iron, and germanium are preferable; and titanium, zirconium, tungsten, iron and germanium are especially preferable. Furthermore, in order to reduce the concentration of the polyester terminal which influences thermal stability of the polyester, among the foregoing metals, metal elements belonging to the 1 groups 3 to 6 of the periodic table and exhibiting the Lewis acidity are preferable. Specifically, examples thereof include scandium, titanium, zirconium, vanadium, molybdenum, and tungsten. In particular, from the standpoint of easiness of availability, titanium and zirconium are preferable, and furthermore, from the standpoint of reaction activity, titanium is preferable.

In some embodiments, the catalyst includes compounds containing an organic group, such as carboxylic acid salts, alkoxy salt organic sulfonic acid salts, or β-diketonate salts each containing such a metal element, etc.; and furthermore, inorganic compounds such as oxides, halides, and the like of the foregoing metals and mixtures thereof.

In some embodiments, the method includes, at the time of polymerization, a compound which is liquid or soluble in an ester low polymer or polyester. In some embodiments, a compound which is liquid or soluble in an ester low polymer or polyester is added because when the catalyst is in a molten or dissolved state at the time of polymerization, the polymerization rate becomes high.

In some embodiments, the catalyst is a titanium compound. In some embodiments, the titanium compound is a tetraalkyl titanate and a hydrolyzate thereof. Non-limiting examples include, but are not limited to, tetra-n-propyl titanate, tetraisopropyl titanate, tetra-n-butyl titanate, tetra-t-butyl titanate, tetraphenyl titanate, tetracyclohexyl titanate, tetrabenzyl titanate, and mixed titanates thereof, and hydrolyzates thereof.

In some embodiments, the catalyst includes titanium (oxy)acetyl acetonate, titanium tetraacetyl acetonate, titanium (diisopropoxide)acetyl acetonate, titanium bis(ammonium lactate)dihydroxide, titanium bis(ethyl acetoacetate) diisopropoxide, titanium (triethanolaminate) isopropoxide, polyhydroxytitanium stearate, titanium lactate, titanium triethanolaminate, butyl titanate dimer, or the like. In some embodiments, the method further comprises adding liquid materials obtained by mixing an alcohol, a group 2 metal compound in the long-form periodic table (Nomenclature of Inorganic Chemistry IUPAC Recommendations 2005) (hereinafter sometimes referred to as "group 2 metal compound in the long-form periodic table"), a phosphoric ester compound, and a titanium compound.

In some embodiments, the catalyst selected from tetra-n-propyl titanate, tetraisopropyl titanate, tetra-n-butyl titanate, titanium (oxy)acetyl acetonate, titanium tetraacetyl acetonate, titanium bis(ammonium lactate)dihydroxide, polyhydroxytitanium stearate, titanium lactate, or butyl titanate dimer; and adding a liquid material obtained by mixing an alcohol, a group 2 metal compound in the long-form periodic table, a phosphoric ester compound, and adding a titanium compound.

In some embodiments, the catalyst is selected from tetra-n-butyl titanate, titanium (oxy)acetyl acetonate, titanium tetraacetyl acetonate, polyhydroxytitanium stearate, titanium lactate, or butyl titanate dimer; and adding a liquid material obtained by mixing an alcohol, a group 2 metal compound in the long-form periodic table, a phosphoric ester compound; and adding a titanium compound.

In some embodiments, the catalyst is selected from tetra-n-butyl titanate, polyhydroxytitanium stearate, titanium (oxy)acetyl acetonate, titanium tetraacetyl acetonate; and adding a liquid material obtained by mixing an alcohol, a group 2 metal compound in the long-form periodic table, a phosphoric ester compound, and adding a titanium compound.

Non-limiting examples of the zirconium compound as a catalyst include, but are not limited to, zirconium tetraacetate, zirconium acetate hydroxide, zirconium tris(butoxy) stearate, zirconyl diacetate, zirconium oxalate, zirconyl oxalate, potassium zirconium oxalate, polyhydroxyzirconium stearate, zirconium ethoxide, zirconium tetra-n-propoxide, zirconium tetraisopropoxide, zirconium tetra-n-butoxide, zirconium tetra-t-butoxide, zirconium tributoxyacetyl acetonate, and mixtures thereof.

In some embodiments, the catalyst is selected from zirconyl diacetate, zirconium tris(butoxy)stearate, zirconium tetraacetate, zirconium acetate hydroxide, ammonium zirconium oxalate, potassium zirconium oxalate, polyhydroxyzirconium stearate, zirconium tetra-n-propoxide, zirconium tetraisopropoxide, zirconium tetra-n-butoxide, and zirconium tetra-t-butoxide are preferable; zirconyl diacetate, zirconium tetraacetate, zirconium acetate hydroxide, zirconium tris(butoxy)stearate, ammonium zirconium oxalate, zirconium tetra-n-propoxide, and zirconium tetra-n-butoxide. In some embodiments, the catalyst is selected from zirconium tris(butoxy)stearate. In some embodiments, a colorless polyester with a high degree of polymerization is easily obtained using zirconium tris(butoxy)stearate.

In some embodiments, the catalyst is a germanium compound. Non-limiting examples of the germanium compound include, but are not limited to, inorganic germanium compounds such as germanium oxide, germanium chloride, etc.; and organic germanium compounds such as a tetraalkoxygermanium, etc. From the standpoints of prices and easiness of availability, germanium oxide, tetraethoxygermanium, tetrabutoxygermanium, and the like are preferable, and germanium oxide is especially preferable.

In some embodiments, the catalyst is an inorganic chloride. Non-limiting examples of inorganic chlorides include, but are not limited to, such as ferric chloride, etc.; inorganic oxides such as triiron tetroxide, etc.; organic iron complexes such as ferrocene, etc.; and the like. In some embodiments, the catalyst is an inorganic oxides.

In some embodiments, the catalyst is a metal-containing compound. Non-limiting examples of metal-containing compounds include, but are not limited to scandium compounds such as scandium carbonate, scandium acetate, scandium chloride, scandium acetyl acetonate, etc.; yttrium compounds such as yttrium carbonate, yttrium chloride, yttrium acetate, yttrium acetyl acetonate, etc.; vanadium compounds such as vanadium chloride, vanadium trichloride oxide, vanadium acetyl acetonate, vanadium acetyl acetonate oxide, etc.; molybdenum compounds such as molybdenum chloride, molybdenum acetate, etc.; tungsten compounds such as tungsten chloride, tungsten acetate, tungstic acid, etc.; lanthanoid compounds such as cerium chloride, samarium chloride, ytterbium chloride, etc.; and the like.

Methods

Aspects of the present disclosure include methods for producing a polyester polymer-polysaccharide nanocomposite resin.

In some embodiments, the method includes preparing a dispersion comprising polysaccharide nanocrystals, an alkane diol monomer and an alkane diacid agent monomer.

In some embodiments, the method further includes polycondensing the alkane diol monomer and the alkane diacid agent monomer in the dispersion to produce a polymer-polysaccharide nanocomposite resin.

Preparation of Dispersion

Aspects of the present methods includes preparing a dispersion comprising polysaccharide nanocrystals, an alkane diol monomer and an alkane diacid agent monomer.

In some embodiments, preparing the dispersion includes dispersing polysaccharide nanocrystals in a solution that includes one or both of an alkane diol monomer and an alkane diacid agent monomer.

In some embodiments, dispersing includes contacting polysaccharide nanocrystals in a solution. In some embodiments, the solution includes one or both of the alkane diol monomer and the alkane diacid agent monomer.

In some embodiments, the solution includes the alkane diol monomer and the alkane diacid agent monomer. In some embodiments, the solution consists of the alkane diol monomer and the alkane diacid agent monomer.

In some embodiments, the solution further includes a non-aqueous solvent. In some embodiments, the solution further includes a non-aqueous solvent organic solvent.

In some embodiments, the solution further includes water. In some embodiments, the water is deionized water.

In some embodiments, dispersing the polysaccharide nanocrystals, the alkane diol monomer, and the alkane diacid agent monomer includes contacting the cellulose nanocrystals with a solution that includes the polysaccharide nanocrystals, the alkane diol monomer, and the alkane diacid agent monomer to produce a mixture; and sonicating the mixture to homogeneously disperse the polysaccharide nanocrystals in the solution and produce the dispersion.

For example, the polysaccharide nanocrystals are added to the alkane diol monomer, and/or the alkane diacid agent and dispersed.

In some embodiments, the method includes charging the alkane diol monomer, and/or the alkane diacid agent to a reaction vessel, to form a reactant mixture. In some embodiments, the method includes stirring the reactants with nitrogen gas flow ranging from 100-250 rpm (e.g., 100 rpm or more, 150 rpm or more, 200 rmp or more, or 250 rmp or more) until a homogenous slurry is formed.

In some embodiments, the method further includes contacting the polysaccharide nanocrystals with the homogenous slurry.

In some embodiments, the method further includes increasing the temperature of the slurry. In some embodiments, the temperature is increased to 100° C. or more, 125° C. or more, 150° C. or more, 175° C. or more, 200° C. or more, 225° C. or more, 250° C. or more, or 275° C. or more. In some embodiments, the temperature is increased for about 10 minutes or more, about 20 minutes or more, about 30 minutes or more, about 40 minutes or more, about 50 minutes or more, about 60 minutes or more, about 70 minutes or more, about 80 minutes or more, about 90 minutes or more, about 100 minutes or more, about 110 minutes or more, about 120 minutes or more, about 130 minutes or more, about 140 minutes or more, or about 150 minutes or more.

In some embodiments, when the temperature is increased, water and THF are formed. In some embodiments, the method further includes removing water and THF from the reactor via a distillation apparatus.

In some embodiments, the polysaccharide nanocrystals are dispersed in the alkane diol monomer by sonicating the polysaccharide-alkane diol mixture. In some embodiments, dispersing the polysaccharide-alkane diol mixture includes sonicating the mixture, as opposed to other mechanical means such as stirring, to eliminate or substantially eliminate sedimentation. In some embodiments, polysaccharide-alkane diol mixtures with higher dispersion values (smaller polysaccharide nanocrystal particle sizes) will ultimately yield polysaccharide nanocomposites with more desirable properties, including increased clarity, processability, and toughness. However, other embodiments of the method may include mechanical means of dispersing the polysaccharide nanocrystals; for example, using a homogenizer for high shear dispersion.

In some embodiments, the polysaccharide nanocrystals are dispersed in the alkane diol monomer with a homogenizer.

In some embodiments, the polysaccharide nanocrystals are dispersed prior to esterification. For example, polysaccharide-alkane diol dispersions may be obtained by dispersing the polysaccharide nanocrystals in an alkane diol monomer prior to esterification. Moreover, the dispersion quality may be verified before proceeding further with production, allowing the dispersion to be adjusted until at a desired level. The dispersion quality can be verified by measuring the dispersion quality before the reaction takes place. For example, in production we can take aliquots of the BDO/NCC dispersion and check to make sure it is meeting our requirements. More data is collected on dispersion levels before the reaction (e.g., 50% or more of material has dimensions of <100 nm) to assess how the final polymer properties are affected, which can include NCC gel size in the final polymer.

In some embodiments, the polysaccharide nanocrystals are dispersed in the alkane diacid agent by sonicating the polysaccharide-alkane diacid agent mixture. In some embodiments, dispersing the polysaccharide-alkane diacid agent mixture includes sonicating the mixture, as opposed to other mechanical means such as stirring, to eliminate or substantially eliminate sedimentation. In some embodiments, polysaccharide-alkane diacid agent mixtures with higher dispersion values (smaller polysaccharide nanocrystal particle sizes) will ultimately yield polysaccharide nanocomposites with more desirable properties, including increased clarity, processability, and toughness. However, other embodiments of the method may include mechanical means of dispersing the polysaccharide nanocrystals; for example, using a homogenizer for high shear dispersion.

In some embodiments, the polysaccharide nanocrystals are dispersed in the -alkane diacid agent with a homogenizer.

In some embodiments, the polysaccharide nanocrystals are dispersed in the alkane diacid agent by sonicating the polysaccharide-alkane diacid agent mixture. In some embodiments, dispersing the polysaccharide-alkane diacid agent mixture includes sonicating the mixture, as opposed to other mechanical means such as stirring, to eliminate or substantially eliminate sedimentation. In some embodiments, polysaccharide-alkane diacid agent mixtures with higher dispersion values (smaller polysaccharide nanocrystal particle sizes) will ultimately yield polysaccharide nanocomposites with more desirable properties, including increased clarity, processability, and toughness. However, other embodiments of the method may include mechanical means of dispersing the polysaccharide nanocrystals; for example, using a homogenizer for high shear dispersion.

In some embodiments, the polysaccharide nanocrystals are dispersed in the -alkane diacid agent with a homogenizer.

In some embodiments, the polysaccharide nanocrystals are dispersed using a high shear disperser.

In some embodiment, the method includes contacting the polysaccharide-alkane diol monomer dispersion with the alkane diacid agent monomer. In some embodiments, the polysaccharide-alkane diol monomer mixture is added to the alkane diacid agent monomer as a slurry.

In some embodiments, sonicating the mixture is performed under conditions sufficient to produce a dispersion with no visible sedimentation is present.

In some embodiment, the method includes contacting the polysaccharide-alkane diol monomer dispersion with the alkane diacid agent monomer. In some embodiments, the polysaccharide-alkane diol monomer mixture is added to the alkane diacid agent monomer as a slurry.

In some embodiments, sonicating the mixture is performed under conditions sufficient to produce a dispersion with no visible sedimentation is present.

In some embodiments, the polysaccharide nanocrystals are dispersed in the alkane diol monomer and an alkane diacid agent by sonicating the polysaccharide-alkane diol-alkane diacid agent mixture. In some embodiments, dispersing the polysaccharide-alkane diol-alkane diacid agent mixture includes sonicating the mixture, as opposed to other mechanical means such as stirring, to eliminate or substantially eliminate sedimentation. In some embodiments, polysaccharide-alkane diol-alkane diacid agent mixtures with higher dispersion values (smaller polysaccharide nanocrystal particle sizes) will ultimately yield polysaccharide nanocomposites with more desirable properties, including increased clarity, processability, and toughness. However, other embodiments of the method may include mechanical means of dispersing the polysaccharide nanocrystals; for example, using a homogenizer for high shear dispersion.

In some embodiments, the polysaccharide nanocrystals are dispersed in the alkane diol monomer-alkane diacid agent mixture with a homogenizer.

In some embodiments, the polysaccharide nanocrystals are dispersed prior to esterification. For example, polysaccharide-alkane diol-alkane diacid agent dispersions may be obtained by dispersing the polysaccharide nanocrystals in an alkane diol monomer-alkane diacid agent prior to esterification. Moreover, the dispersion quality may be verified before proceeding further with production, enabling the dispersion to be adjusted until at a desired level.

In some embodiments, sonicating the mixture includes sonicating, for a duration of about 5 minutes or longer. In some embodiments, sonicating the mixture includes sonicating (e.g., with at least 60% of an amplitude of a maximum power of a sonicator), for a duration of about 5 minutes or longer. In some embodiments, sonicating the mixture includes sonicating (e.g., with at least 80% of an amplitude of a maximum power of a sonicator), for a duration of about 5 minutes or longer. In some embodiments, sonicating the mixture includes sonicating (e.g., with at least 100% of an amplitude of a maximum power of a sonicator), for a duration of about 5 minutes or longer.

In some embodiments, sonicating the mixture includes sonicating, for a duration of about 6 minutes or longer, 7 minutes or longer, 8 minutes or longer, 9 minutes or longer, 10 minutes or longer, 11 minutes or longer, 12 minutes or longer, 13 minutes or longer, 14 minutes or longer, or 15 minutes or longer.

Components for Dispersion

In some embodiments, the dispersion includes polysaccharide nanocrystals, and one or more monomers. In some embodiments, the one or more monomers include an alkane diol monomer and an alkane diacid agent monomer.

In some embodiments, the polysaccharide nanocrystals are derived from heparin, chitosan, chitin, hyaluronan, starch, cellulose, alginate, pectin, guar, starch/chitosan, chitosan/heparin, chitosan/hyaluronan, hyaluronan/heparin, or cellulose and chitin whiskers and platelet-like starch. In some embodiments, the polysaccharide nanocrystals are derived from cellulose, starch or chitin.

In some embodiments, the polysaccharide nanocrystals are derived from cellulose. In some embodiments, the polysaccharide nanocrystals are derived from starch. In some embodiments, the polysaccharide nanocrystals are derived from chitin.

In some embodiments, the polysaccharide nanocrystals can be a sphere, rod, disk, or any other shape. In some embodiment, the nanocrystals can have a narrow size distribution. In some embodiment, the nanocrystals can have a wide size distribution.

In some embodiments, the polysaccharide nanocrystals are derived from cellulose. In some embodiments, the polysaccharide nanocrystals are cellulose nanocrystals.

In some embodiments, the cellulose nanocrystal is a crystal that is derived by subjecting a cellulose fiber to chemical treatment such as acid hydrolysis. In some embodiments, the cellulose nanocrystals are derived from acid hydrolyzed cellulose from cellulosic biomass via an acid hydrolysis technique similar to what was first as first described in Rånby, B. G. (Rånby, B. G. (1951) *Discussion Faraday Society,* 11, 158-164). NCCs produced via sulfuric acid and neutralized with base (NaOH in this instance) will contain an amount of sodium sulfate groups that affect dispersibility in hydrophilic mediums.

In some embodiments, the acid hydrolyzed cellulose is obtained from naturally occurring cellulose fibers. In some embodiments, the acid hydrolyzed cellulose is obtained, for example, plant biomass, vascular plants, cotton plants, wood pulp, jute, hemp, corn, flasks, rice, wheat straw, or sisal. In some embodiments, the cellulose is obtained from plant biomass, which includes, but is not limited to trees, grasses, cotton, sisal, bamboo and ramie.

In some embodiments, cellulose nanocrystals can be found as structural components in tunicates (sea creature similar to sea cucumbers), and are produced naturally by the *Acetobacter xylinum* bacteria.

In some embodiments, the cellulose nanocrystals have average dimensions of about 1 to 80 nm in width and about 25 to 1000 nm in length. In some embodiments, the cellulose nanocrystals have average dimensions ranging from about 1 to 100 nm in width and a length ranging from about 25 to 3000 nm. In some embodiments, the cellulose nanocrystals have average dimensions of about 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, 95 nm or more, or 100 nm or more in width; and 25 nm or more, 50 nm or more, 100 nm or more, 150 nm or more, 200 nm or more, 250 nm or more, 300 nm or more, 350 nm or more, 400 nm or more, 500 nm or more, 550 nm or more, 600 nm or more, 650 nm or more, 700 nm or more, 800 nm or more, 850 nm or more, 900 nm or more, 950 nm or more, 1000 nm or more, 1500 nm or more, 2000 nm or more, 2500 nm or more, or 3000 nm or more, in length.

In some embodiments, the nanocrystals in the dispersion have a particle size distribution ranging from about 1 d·nm to about 400 d·nm. In some embodiments, the nanocrystals in the dispersion have a particle size distribution ranging from about 1 d·nm to about 50 d·nm, about 50 d·nm to about 100 d·nm, about 100 d·nm to about 150 d·nm, about 150 d·nm to about 200 d·nm, 200 d·nm to about 250 d·nm, 250 d·nm to about 300 d·nm, 300 d·nm to about 350 d·nm, 350 d·nm to about 400 d·nm. In some embodiments, the nanocrystals in the dispersion have a particle size distribution ranging from about 1 d·nm to about 20 d·nm. In some embodiments, the nanocrystals in the dispersion have a particle size distribution ranging from about 10 d·nm to about 100 d·nm. In some embodiments, the nanocrystals in the dispersion have a particle size distribution ranging from about 10 d·nm to about 30 d·nm. In some embodiments, the nanocrystals in the dispersion have a particle size distribution ranging from about 100 d·nm to about 200 d·nm. In some embodiments, the nanocrystals in the dispersion have a particle size distribution of 1 d·nm or more, 2 d·nm or more, 4 d·nm or more, 6 d·nm or more, 8 d·nm or more, 10 d·nm or more, 12 d·nm or more, 14 d·nm or more, 16 d·nm or more, 18 d·nm or more, 20 d·nm or more, 22 d·nm or more, 24 d·nm or more, 26 d·nm or more, 28 d·nm or more, 30 d·nm or more, 32 d·nm or more, 34 d·nm or more, 36 d·nm or more, 38 d·nm or more, 40 d·nm or more, 42 d·nm or more, 44 d·nm or more, 46 d·nm or more, 48 d·nm or more, 50 d·nm or more, 52 d·nm or more, 54 d·nm or more, 56 d·nm or more, 58 d·nm or more, 60 d·nm or more, 62 d·nm or more, 64 d·nm or more, 66 d·nm or more, 68 d·nm or more, 70 d·nm or more, 72 d·nm or more, 74 d·nm or more, 76 d·nm or more, 78 d·nm or more, 80 d·nm or more, 82 d·nm or more, 84 d·nm or more, 86 d·nm or more, 88 d·nm or more, 90 d·nm or more, 92 d·nm or more, 94 d·nm or more, 96 d·nm or more, 98 d·nm or more, or 100 d·nm or more. In some embodiments, the nanocrystals in the dispersion have a particle size distribution of 100 d·nm or more, 125 d·nm or more, 150 d·nm or more, 175 d·nm or more, 200 d·nm or more, 225 d·nm or more, 250 d·nm or more, 275 d·nm or more, 300 d·nm or more, 325 d·nm or more, 350 d·nm or more, 400 d·nm or more, 425 d·nm or more, 500 d·nm or more, 525 d·nm or more, 550 d·nm or more, 575 d·nm or more, 600 d·nm or more, 625 d·nm or more, 650 d·nm or more, 675 d·nm or more, 700 d·nm or more, 725 d·nm or more, 750 d·nm or more, 775 d·nm or more, 800 d·nm or more, 825 d·nm or more, 850 d·nm or more, 875 d·nm or more, 900 d·nm or more, 925 d·nm or more, 950 d·nm or more, 975 d·nm or more, or 1000 d·nm or more.

In some embodiments, increasing the length of the cellulose nanocrystals increases load distribution potential throughout the polymer. In some embodiments, as orientation of the cellulose nanocrystals within the polymer increases the interfacial contact between adjacent cellulose nanocrystals in the axial orientation, where ultimate tensile strength can be increased. In some embodiments, in the transverse direction, Cellulose nanocrystal morphology (e.g., length, aspect ratio, length polydispersity) and surface charge vary greatly based on synthesis conditions.

In some embodiments, acid hydrolysis is used to break down cellulose microfibrils by digesting the amorphous regions that connect cellulose nanocrystals. In some embodiments, process typically requires heating, agitation, rinsing, filtration, dialysis, and ultrasonication, with the parameters of each step having a direct impact on cellulose nanocrystal morphology and/or surface chemistry. In some embodiments, the final result of cellulose nanocrystal processing includes a suspension of liquid crystalline cellulose nanocrystals that is produced, forming either a nematic or chiral nematic mesophase (e.g., dependent on cellulose nanocrystal length, aspect ratio, length polydispersity, surface charge, cellulose nanocrystal concentration, and electrolyte concentration).

In some embodiments, the polymer of the polymer-polysaccharide nanocomposite resin includes an aliphatic polyester polymer. In some embodiments, the aliphatic polyester polymer can include, but is not limited to, an aliphatic polyester polymer selected from polylactide (PLA) (e.g., poly(lactic acid)), polyglycolide (PGA) (e.g., Polyglycolic acid), poly(ε-caprolactone) (PCL), poly(γ-valerolactone) (PVL), and a co-polymer poly(lactic-co-glycolic acid) (PLGA).

In some embodiments, the polymer of the polymer-polysaccharide nanocomposite resin includes polybutylene succinate homopolymer or polybutylene succinate copolymer (e.g., polybutylene succinate adipate copolymer).

In some aspects, the dispersion includes an alkane diol monomer.

In some embodiments, the alkane diol monomer includes, but is not limited to, a 1,4-butanediol monomer, a 1,2-ethanediol monomer, a 1,3-propanediol monomer, a 1,5-pentanediol monomer, or a 1,6-hexanediol monomer.

In some embodiments, the alkane diol monomer includes one or more diols to form a polyester composite. Non-limiting examples of other suitable diols include, but are not limited to, ethylene glycol, 1,3-propylene glycol, neopentyl glycol, 1,6-hexamethylene glycol, 1,4-cyclohexanedimethanol, hydroquinone, 1.5-dihydroxynaphthalene, 4,4'-dihydroxydiphenyl, bis(p-hydroxyphenyl)methane, bis(p-hydroxyphenyl)-2.2-propane, and combinations thereof.

In some embodiments, the alkane diol monomer 1,4-butanediol.

In some embodiments, alkane diol monomer is 1,2-ethanediol.

In some embodiments, alkane diol monomer is 1,3-propanediol

In some embodiments, the dispersion includes an alkane diacid agent monomer. In some embodiments, the alkane diacid agent monomer includes, but is not limited to, the alkane diacid agent monomer selected from succinic acid, monoalkyl succinate, dialkyl succinate (e.g., dimethyl succinate or diethyl succinate), succinic anhydride, adipic acid, monoalkyl adipate, dialkyl adipate (e.g., dimethyl adipate or diethyl adipate), and adipic anhydride.

In some embodiments, the alkane diacid agent monomer is selected from oxalic acid, malonic acid, succinic acid, glutaric acid, adipic acid, suberic acid, sebacic acid, cyclohexanedicarboxylic acid, and their cyclic acid anhydride equivalents.

In certain embodiments, the alkane diol monomer is a 1,4-butanediol monomer. In certain embodiments, the alkane diacid agent monomer is a succinic acid agent monomer. In certain embodiments, alkane diacid agent monomer is succinic anhydride.

In some embodiments, the dispersing includes contacting cellulose nanocrystals, the 1,4-butanediol monomer, and the succinic acid agent monomer to produce a cellulose mixture.

In some embodiments, the alkane diacid agent monomer is a succinic acid agent monomer or derivative thereof. In some embodiments, the alkane diacid agent monomer is a succinic acid agent monomer. In some embodiments, the succinic acid agent is succinic anhydride.

In some embodiments, the succinic acid agent monomer includes, but is not limited to, a succinic acid agent selected from succinic acid, monoalkyl succinate, dialkyl succinate (e.g., dimethyl succinate or diethyl succinate), or succinic anhydride.

In some embodiments, the succinate acid agent is a succinate derivative. In some embodiments, the succinate derivative is succinate anhydride. In some embodiments, the succinate anhydride increases the speed of esterification with 1,4 butanediol and also reduces the amount of hazardous THF produced during the esterification step. However, other suitable non-limiting examples of succinate derivatives may include succinic acid or succinate esters.

In some aspects, the dispersion includes one or more additional monomers.

In some embodiments, the one or more additional monomers, include, but are not limited to, co-monomers, epoxy-derivatives, oils, pigments, cross-linkers, and the like.

In some embodiments, the one or more additional monomers includes an additional alkane diol monomer and/or an additional alkane diacid agent monomer.

In some embodiments, an additional alkane diol monomer includes, but is not limited to, alkane diol monomer includes, but is not limited to, a 1,4-butanediol monomer, a 1,2-ethanediol monomer, a 1,3-propanediol monomer, a 1,5-pentanediol monomer, or a 1,6-hexanediol monomer; and/or an additional alkane diacid agent monomer.

In some embodiments, an additional diacid agent monomer includes, but is not limited to, the alkane diacid agent monomer selected from succinic acid, monoalkyl succinate, dialkyl succinate (e.g., dimethyl succinate or diethyl succinate), succinic anhydride, adipic acid, monoalkyl adipate, dialkyl adipate (e.g., dimethyl adipate or diethyl adipate), and adipic anhydride.

In some embodiments, the additional alkane diacid agent monomer includes adipic anhydride. In some embodiments, the additional alkane diacid agent monomer includes fumaric acid, or an ester or anhydride thereof.

In some embodiments, the one or more additional components can include a hydrophobic agent. In some embodiments, the hydrophobic agent is an oil. In some embodiments, the hydrophobic agent is an elastomer material. In some embodiments, the hydrophobic agent is an epoxidized soybean oil or elastomer material. The hydrophobic agent can be utilized as a capping agent at the terminal of a polyester polymer in the composition, e.g., linked via an ether, ester or carbamate linkage.

In some embodiments, the one or more additional components include, but are not limited to agents to provide additional water and oxygen barrier properties may be included. Non-limiting exemplary water and oxygen barrier agents include candelilla wax, beeswax, and other waxes. In some embodiments, such a barrier agent is derived from a renewable source.

In some embodiments, one or more additional monomers include gloss agents that provide an aesthetically pleasing gloss to a finished product. Non-limiting exemplary gloss agents include shea butter and nut oils, such as Brazil nut oil. In some embodiments, a gloss agent is derived from a renewable source.

In some embodiments, the one or more additional monomers include, but are not limited to impact modifiers, antioxidants, antibacterial agents, antifungal agents, antistatic agents, fillers, thermal stabilizers, UV stabilizers, dyes, fillers, crystallizing promoters and coupling agents.

Non-limiting examples of antioxidants include hindered phenol antioxidants, such as p-tert-butyl hydroxytoluene and p-tert-butyl hydroxyanisole, sulfur antioxidants such as distearyl thiodipropionate and dilauryl thiodipropionate, and the like; heat stabilizers include triphenyl phosphite, trilauryl phosphite, tris-nonylphenyl phosphite and the like; UV stabilizers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmitate and the like; antistatic agents include N,N-bis(hydroxyethyl) alkyl amine, alkyl amine, alkyl allyl sulfonate, alkyl sulfonate and the like; flame retarders include hexabromocyclododecane, tris-(2,3-dichloropropyl) phosphate, pentabromophenyl allyl ether and the like; anti-blocking agents include the combination of inorganic fillers such as silica and oleamide and the like; inorganic fillers or nucleating agents include calcium carbonate, silica, titanium oxide, talc, mica, barium sulfate, alumina, mixture of NaHCO3 and citric acid and the like; crystallizing promoters include polyethylene terephthalate, poly-transcyclohexane dimethanol terephthalate and the like; organic fillers include wood powder, rice hull, wastepaper such as newspaper, starches (including modified materials such as alpha-starch), cellulose and the like.

In some embodiments, a polyether having hydroxyl end groups may be used in combination with the diols disclosed in the present disclosure. As the polyether having hydroxyl end groups, the carbon number has a lower limit of usually 4 or more, preferably 10 or more and an upper limit of usually 1,000 or less, preferably 200 or less, more preferably 100 or less. Non-limiting examples of the polyether having hydroxyl end groups include, but are not limited to diethylene glycol, triethylene glycol, polyethylene glycol, polypropylene glycol, polytetramethylene glycol, poly-1,6-hexamethylene glycol, and the like. Moreover, copolymerized polyether of polyethylene glycol and polypropylene glycol, and the like can be also used.

In some embodiments, the one or more additional monomers includes one or more dicarboxylic acids or anhydrides. Non-limiting examples may include, but are not limited to oxalic acid, malonic acid, succinic acid, glutaric acid, adipic acid, suberic acid, sebacic acid, cyclohexanedicarboxylic acid, and their cyclic acid anhydride equivalents.

In some embodiments, the one or more additional monomers include an epoxidized oil, epoxy derivative or fatty acid. In some embodiments, the epoxidized oil, epoxy derivative or fatty acid are capable of esterification.

In some embodiments, the one or more additional monomers include an epoxidized oil, epoxy derivative or fatty acid. In some embodiments, the epoxidized oil, epoxy derivative or fatty acid are capable of esterification. In some embodiments, the epoxy derivative or epoxidized oil is added at the end of the reaction. For example, in some embodiments, the method includes adding the epoxy derivative or epoxidized after re-pressurizing the vessel just before the cool down and discharging of the polymer. In some embodiments, the method includes adding NCCs, epoxy derivative, and/or epoxidized oil can be added up front with the alkane diol monomer and/or alkane diacid agent monomer. For example, in some embodiments, the method includes adding NCCs in the beginning of the reaction in the form of a dispersion. In some embodiments, the method includes adding epoxy derivative or epoxidized oil at the very end of the esterification process right before the catalyst is added and the polycondensation takes place. In some examples, the epoxy derivative or epoxidized oil is allowed to react for 5 minutes before adding the catalyst. The high shear disperser method follows the same process as the sonication method for time and power consumption, but instead uses the equipment described in https://www(dot)mixers(dot)com/products/high-speed-dispersers/.

In some embodiments, the one or more additional monomers is an epoxidized oil. In some embodiments, the one or more additional monomers is an epoxidized derivative. In some embodiments, the epoxidized oil or an epoxy derivative includes, but is not limited to epoxidized linseed oil, as epoxidized linseed oil, lard, beef tallow, fish oil, coffee oil, soybean oil, safflower oil, tung oil, tall oil, calendula, rapeseed oil, peanut oil, sesame oil, grape seed oil, olive oil, jojoba oil, dehydrated castor oil, tallow oil, sunflower oil, cottonseed oil, corn oil, canola oil, orange oil, and mixtures thereof.

In some embodiments, the one or more additional monomers includes a catalyst.

Non-limiting exemplary catalysts include, but are not limited to titanium or zirconium compounds, such as titanium lactate or zirconium butoxide. In general, a compound containing at least one member among metal elements belong to the groups 1 to 14 of the periodic table may be used as the esterification reaction catalyst. Specifically, examples of the metal element include scandium, yttrium, samarium, titanium, zirconium, vanadium, chromium, molybdenum, tungsten, tin, antimony, cerium, germanium, zinc, cobalt, manganese, iron, aluminum, magnesium, calcium, strontium, sodium, potassium, and the like. Of these, scandium, yttrium, titanium, zirconium, vanadium, molybdenum, tungsten, zinc, iron, and germanium are preferable; and titanium, zirconium, tungsten, iron and germanium are especially preferable. Furthermore, in order to reduce the concentration of the polyester terminal which influences thermal stability of the polyester, among the foregoing metals, metal elements belonging to the groups 3 to 6 of the periodic table and exhibiting the Lewis acidity are preferable. Specifically, examples thereof include scandium, titanium, zirconium, vanadium, molybdenum, and tungsten. In particular, from the standpoint of easiness of availability, titanium and zirconium are preferable, and furthermore, from the standpoint of reaction activity, titanium is preferable.

In some embodiments, the catalyst includes compounds containing an organic group, such as carboxylic acid salts, alkoxy salt organic sulfonic acid salts, or β-diketonate salts each containing such a metal element, etc.; and furthermore, inorganic compounds such as oxides, halides, and the like of the foregoing metals and mixtures thereof.

In some embodiments, the method includes, at the time of polymerization, a compound which is liquid or soluble in an ester low polymer or polyester. In some embodiments, a compound which is liquid or soluble in an ester low polymer or polyester is added because when the catalyst is in a molten or dissolved state at the time of polymerization, the polymerization rate becomes high.

In some embodiments, the catalyst is a titanium compound. In some embodiments, the titanium compound is a tetraalkyl titanate and a hydrolyzate thereof. Non-limiting examples include, but are not limited to, tetra-n-propyl titanate, tetraisopropyl titanate, tetra-n-butyl titanate, tetra-t-butyl titanate, tetraphenyl titanate, tetracyclohexyl titanate, tetrabenzyl titanate, and mixed titanates thereof, and hydrolyzates thereof.

In some embodiments, the catalyst includes titanium (oxy)acetyl acetonate, titanium tetraacetyl acetonate, titanium (diisopropoxide)acetyl acetonate, titanium bis(ammonium lactate)dihydroxide, titanium bis(ethyl acetoacetate) diisopropoxide, titanium (triethanolaminate) isopropoxide, polyhydroxytitanium stearate, titanium lactate, titanium triethanolaminate, butyl titanate dimer, or the like. In some embodiments, the method further comprises adding liquid materials obtained by mixing an alcohol, a group 2 metal compound in the long-form periodic table (Nomenclature of Inorganic Chemistry IUPAC Recommendations 2005) (hereinafter sometimes referred to as "group 2 metal compound in the long-form periodic table"), a phosphoric ester compound, and a titanium compound.

In some embodiments, the catalyst selected from tetra-n-propyl titanate, tetraisopropyl titanate, tetra-n-butyl titanate, titanium (oxy)acetyl acetonate, titanium tetraacetyl acetonate, titanium bis(ammonium lactate)dihydroxide, polyhydroxytitanium stearate, titanium lactate, or butyl titanate dimer; and adding a liquid material obtained by mixing an alcohol, a group 2 metal compound in the long-form periodic table, a phosphoric ester compound, and adding a titanium compound.

In some embodiments, the catalyst is selected from tetra-n-butyl titanate, titanium (oxy)acetyl acetonate, titanium tetraacetyl acetonate, polyhydroxytitanium stearate, titanium lactate, or butyl titanate dimer; and adding a liquid material obtained by mixing an alcohol, a group 2 metal compound in the long-form periodic table, a phosphoric ester compound; and adding a titanium compound.

In some embodiments, the catalyst is selected from tetra-n-butyl titanate, polyhydroxytitanium stearate, titanium (oxy)acetyl acetonate, titanium tetraacetyl acetonate; and adding a liquid material obtained by mixing an alcohol, a group 2 metal compound in the long-form periodic table, a phosphoric ester compound, and adding a titanium compound.

Non-limiting examples of the zirconium compound as a catalyst include, but are not limited to, zirconium tetraacetate, zirconium acetate hydroxide, zirconium tris(butoxy) stearate, zirconyl diacetate, zirconium oxalate, zirconyl oxalate, potassium zirconium oxalate, polyhydroxyzirconium stearate, zirconium ethoxide, zirconium tetra-n-propoxide, zirconium tetraisopropoxide, zirconium tetra-n-butoxide, zirconium tetra-t-butoxide, zirconium tributoxyacetyl acetonate, and mixtures thereof.

In some embodiments, the catalyst is selected from zirconyl diacetate, zirconium tris(butoxy)stearate, zirconium tetraacetate, zirconium acetate hydroxide, ammonium zirconium oxalate, potassium zirconium oxalate, polyhydroxyzirconium stearate, zirconium tetra-n-propoxide, zirconium tetraisopropoxide, zirconium tetra-n-butoxide, and zirconium tetra-t-butoxide are preferable; zirconyl diacetate, zirconium tetraacetate, zirconium acetate hydroxide, zirconium tris(butoxy)stearate, ammonium zirconium oxalate, zirconium tetra-n-propoxide, and zirconium tetra-n-butoxide. In some embodiments, the catalyst is selected from zirconium tris(butoxy)stearate. In some embodiments, a colorless polyester with a high degree of polymerization is easily obtained using zirconium tris(butoxy)stearate.

In some embodiments, the catalyst is a germanium compound. Non-limiting examples of the germanium compound include, but are not limited to, inorganic germanium compounds such as germanium oxide, germanium chloride, etc.; and organic germanium compounds such as a tetraalkoxygermanium, etc. From the standpoints of prices and easiness of availability, germanium oxide, tetraethoxygermanium, tetrabutoxygermanium, and the like are preferable, and germanium oxide is especially preferable.

In some embodiments, the catalyst is an inorganic chloride. Non-limiting examples of inorganic chlorides include, but are not limited to, such as ferric chloride, etc.; inorganic oxides such as triiron tetroxide, etc.; organic iron complexes such as ferrocene, etc.; and the like. In some embodiments, the catalyst is an inorganic oxides.

In some embodiments, the catalyst is a metal-containing compound. Non-limiting examples of metal-containing compounds include, but are not limited to scandium compounds such as scandium carbonate, scandium acetate, scandium chloride, scandium acetyl acetonate, etc.; yttrium compounds such as yttrium carbonate, yttrium chloride, yttrium acetate, yttrium acetyl acetonate, etc.; vanadium compounds such as vanadium chloride, vanadium trichloride oxide, vanadium acetyl acetonate, vanadium acetyl acetonate oxide, etc.; molybdenum compounds such as molybdenum chloride, molybdenum acetate, etc.; tungsten compounds such as tungsten chloride, tungsten acetate, tungstic acid, etc.; lanthanoid compounds such as cerium chloride, samarium chloride, ytterbium chloride, etc.; and the like.

Polycondensation

Aspects of the present methods include polycondensing an alkane diol monomer and an alkane diacid agent monomer in the dispersion to produce a polymer-polysaccharide nanocomposite resin.

In some embodiments, polycondensing incudes esterifying the alkane diol monomer and the alkane diacid agent monomer to form a plurality of oligomers. In some embodiments, polycondensing further includes condensing the plurality of oligomers to produce high MW polymers (e.g., as described herein) in the polymer-polysaccharide nanocomposite resin.

In some embodiments, the oligomers have an average MW of 500 Da or more, up to 10,000 Da. In some embodiments, the oligomers have an average MW of 1000 to 10,000 Da.

In some embodiments, the oligomer has formula (IIa):

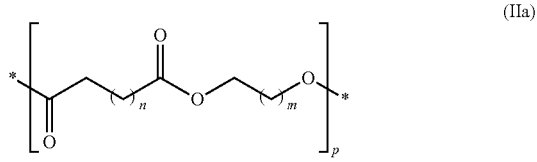

where:
n is 1 to 11;
m is 1 to 11;
p is 1 to 100; and
each * independently represents H, OH, a co-polymer segment, a repeat unit, a co-monomer, or a grafted polysaccharide nanoparticle.

In some embodiments of formula (IIa), p is 1 to 50, such as 5 to 50, 10 to 50, 10 to 40, or 20 to 40.

In some embodiments, the oligomer is a PBS or PBF homopolymer. In some embodiments, the oligomer is a PBS or PBF copolymer. In some embodiments, the oligomer is represented by the formula (IIIa):

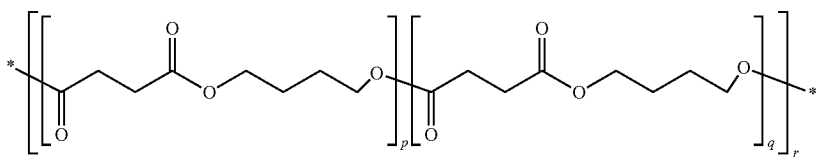

where
p is 0 to 50;
q is 0 or 50, where p+q>0; and
r is 1 to 50;
each * independently represents H, OH, a co-polymer segment, a repeat unit, a co-monomer, or a grafted polysaccharide nanoparticle. The oligomer can have up to about 50 repeat units in total. In some cases, the oligomer has an average MW of 1000 to 10,000 Da.

In some embodiments of formula (IIIa), (p+q)r is <50. In some embodiments of formula (IIIa), r is 1 to 50, such as 5 to 50, 10 to 50, 10 to 40, or 20 to 40.

In some embodiments, the plurality of oligomers and the high MW polymers each include a butylene succinate repeating unit. In some embodiments, the oligomers and the high MW polymers each include a plurality of butylene succinate repeating units. In some embodiments, the oligomers and the high MW polymers each include blocks or segments of polybutylene succinate.

In some embodiments, the polymer of the polymer-polysaccharide nanocomposite resin is polybutylene succinate homopolymer or polybutylene succinate copolymer (e.g., polybutylene succinate adipate copolymer).

In some embodiments, polycondensing further includes condensing an oligomer or polymer with an epoxidized oil. In such embodiments, the dispersion includes the epoxidized oil.

In some embodiments, the polycondensing further includes condensing the nanocomposite resin with an epoxy derivative (e.g., an epoxidized oil or fatty acid capable of esterification).

The present disclosure includes nanocomposite synthetic precursor compositions that include a mixture of a plurality of oligomers (e.g., as described herein), cellulose nanocrystals, and optionally, one or more reagents or solvents (e.g., as described herein) suitable for polycondensation.

Esterification

Aspects of the present methods include esterifying the alkane diol monomer and the alkane diacid agent monomer to form a plurality of oligomers. Esterification of an epoxy derivative to the polybutylene succinate nanocomposite increases its durability, increases the melt viscosity, and reduces the concentration of acid end groups of the polybutylene succinate nanocomposite and thereby facilitates its processability and stabilizes it against thermal and hydrolytic effects. The resulting polybutylene succinate nanocomposite is biodegradable, and largely comprised of ester bonds, with a few ether bonds that are introduced with one of the reactants.

In some embodiments, polycondensing further includes esterifying an epoxidized oil or epoxy derivative (e.g., an epoxidized oil or epoxy derivative as an additional component).

In some embodiments, the one or more additional monomers include an epoxidized oil, epoxy derivative or fatty acid. In some embodiments, the epoxidized oil, epoxy derivative or fatty acid are capable of esterification. In some embodiments, the epoxy derivative or epoxidized oil is added at the very end of the esterification process right before the catalyst is added and the polycondensation takes place. In some examples, the epoxy derivative or epoxidized oil is allowed to react for 5 minutes before adding the catalyst. The high shear disperser method follows the same process as the sonication method for time and power consumption, but instead uses the equipment described in https://www(dot)mixers(dot)com/products/high-speed-dispersers/.

In some embodiments, the one or more additional monomers is an epoxidized oil. In some embodiments, the one or more additional monomers is an epoxidized derivative. In some embodiments, the epoxidized oil or an epoxy derivative includes, but is not limited to epoxidized linseed oil, as epoxidized linseed oil, lard, beef tallow, fish oil, coffee oil, soybean oil, safflower oil, tung oil, tall oil, calendula, rapeseed oil, peanut oil, sesame oil, grape seed oil, olive oil, jojoba oil, dehydrated castor oil, tallow oil, sunflower oil, cottonseed oil, corn oil, canola oil, orange oil, and mixtures thereof.

In some embodiments, esterification is carried out in a vacuum environment or under inert gas conditions. For example, the esterification reaction may be carried out in a reaction vessel with nitrogen gas. The esterification may be carried out at about ambient pressure or slightly higher with any inert gas. The slurry may be heated at a temperature of about 100° C. or more, about 105° C. or more, about 110° C. or more, about 120° C. or more, about 130° C. or more, about 140° C. or more, or about 150° C. or more, to initiate the reaction.

In some embodiments, the esterification may be carried out in a gas phase.

In some embodiments, esterifying includes heating the dispersion to at an initial temperature of 100° C. to 140° C. (e.g., esterifying is initiated at 110° C.±10° C., 110° C.±5° C., or about 110° C.). In some embodiments, esterifying includes heating the dispersion to an initial temperature of about 100° C. or more, about 105° C. or more, about 110° C. or more, about 120° C. or more, about 130° C. or more, about 140° C. or more, or about 150° C. or more.

In some embodiments, esterifying further includes, after the reaction temperature exceeds 140° C., heating the dispersion to a second temperature of 200° C. to 250° C. (e.g., 225° C.±15° C., or about 225° C.). In some embodiments, esterifying further includes, after the reaction temperature exceeds 140° C., heating the dispersion to a second temperature of 200° C. or more, 225° C. or more, 230° C. or more, 235° C. or more, 240° C. or more, 245° C. or more, or 250° C. or more. In some embodiments, esterifying further includes, after the reaction temperature exceeds 140° C., heating the dispersion to a second temperature of 200° C.±15° C., 215° C.±15° C., 230° C.±15° C., 245° C.±15° C., or 250° C.±15° C.

Catalyst

In some embodiments, polycondensing is performed in the presence of a catalyst. In some embodiments, rate of the reaction may be further increased by adding of a catalyst. In some embodiments, polycondensing further includes adding a catalyst (e.g, a catalyst added to the dispersion or during polycondensation).

As for the addition amount of the catalyst in the case of using a metal compound as such an esterification catalyst, a lower limit value thereof is generally 0.1 ppm by mass or more, preferably 0.5 ppm by mass or more, and more preferably 1 ppm by mass or more, and an upper limit value thereof is generally not more than 3,000 ppm by mass, preferably not more than 2,000 ppm by mass, more preferably not more than 1,000 ppm by mass, and especially preferably not more than 500 ppm by mass, in terms of a metal amount relative to the formed polyester. Where the amount of the catalyst to be used is too high, such is economically disadvantageous. Additionally, there may be the case where the terminal carboxyl group concentration in the polyester becomes high. Therefore, there is a concern that because of increases in the terminal carboxyl group concentration and the residual catalyst concentration, thermal stability and hydrolysis resistance of the polyester decrease. Conversely, where the amount of the catalyst to be used is too low, the polymerization activity decreases, and following this, thermal decomposition of the polyester is induced during the production of a polyester. As a result, the yield of a polyester showing practically useful physical properties is low.

The timing of the addition of the catalyst to the reaction system is not particularly limited. In some embodiments, the catalyst is added before the esterification reaction step. In some embodiments, the catalyst may be added at the time of charging the raw materials. In some embodiments, the catalyst is added after the esterification reaction step.

Non-limiting exemplary catalysts include, but are not limited to titanium or zirconium compounds, such as titanium lactate or zirconium butoxide. In general, a compound containing at least one member among metal elements belong to the groups 1 to 14 of the periodic table may be used as the esterification reaction catalyst. Specifically, examples of the metal element include scandium, yttrium, samarium, titanium, zirconium, vanadium, chromium, molybdenum, tungsten, tin, antimony, cerium, germanium, zinc, cobalt, manganese, iron, aluminum, magnesium, calcium, strontium, sodium, potassium, and the like. Of these, scandium, yttrium, titanium, zirconium, vanadium, molybdenum, tungsten, zinc, iron, and germanium are preferable; and titanium, zirconium, tungsten, iron and germanium are especially preferable. Furthermore, in order to reduce the concentration of the polyester terminal which influences thermal stability of the polyester, among the foregoing metals, metal elements belonging to the groups 3 to 6 of the periodic table and exhibiting the Lewis acidity are preferable. Specifically, examples thereof include scandium, titanium, zirconium, vanadium, molybdenum, and tungsten. In particular, from the standpoint of easiness of availability, titanium and zirconium are preferable, and furthermore, from the standpoint of reaction activity, titanium is preferable.

In some embodiments, the catalyst includes compounds containing an organic group, such as carboxylic acid salts, alkoxy salt organic sulfonic acid salts, or β-diketonate salts each containing such a metal element, etc.; and furthermore, inorganic compounds such as oxides, halides, and the like of the foregoing metals and mixtures thereof.

In some embodiments, the method includes, at the time of polymerization, a compound which is liquid or soluble in an ester low polymer or polyester. In some embodiments, a compound which is liquid or soluble in an ester low polymer or polyester is added because when the catalyst is in a molten or dissolved state at the time of polymerization, the polymerization rate becomes high.

In some embodiments, esterifying is carried out in the absence of a solvent. In some embodiments, esterifying is carried out in the presence of a solvent. In some embodiments, a small amount of a solvent may be used in order to dissolve the catalyst. Non-limiting examples of this solvent for use in catalyst dissolution include alcohols such as methanol, ethanol, isopropanol, butanol, etc.; the foregoing diols such as ethylene glycol, butanediol, pentanediol, etc.; ethers such as diethyl ether, tetrahydrofuran, etc.; nitriles such as acetonitrile, etc.; hydrocarbon compounds such as heptane, toluene, etc.; water; and mixtures thereof and the like. As for the use amount thereof, the solvent is used in such a manner that the catalyst concentration is generally 0.0001% by mass or more and not more than 99% by mass.

In some embodiments, the catalyst is a titanium compound. In some embodiments, the titanium compound is a tetraalkyl titanate and a hydrolyzate thereof. Non-limiting examples include, but are not limited to, tetra-n-propyl titanate, tetraisopropyl titanate, tetra-n-butyl titanate, tetra-t-butyl titanate, tetraphenyl titanate, tetracyclohexyl titanate, tetrabenzyl titanate, and mixed titanates thereof, and hydrolyzates thereof.

In some embodiments, the catalyst includes titanium (oxy)acetyl acetonate, titanium tetraacetyl acetonate, titanium (diisopropoxide)acetyl acetonate, titanium bis(ammonium lactate)dihydroxide, titanium bis(ethyl acetoacetate) diisopropoxide, titanium (triethanolaminate) isopropoxide, polyhydroxytitanium stearate, titanium lactate, titanium triethanolaminate, butyl titanate dimer, or the like. In some embodiments, the method further comprises adding liquid materials obtained by mixing an alcohol, a group 2 metal compound in the long-form periodic table (Nomenclature of Inorganic Chemistry IUPAC Recommendations 2005) (hereinafter sometimes referred to as "group 2 metal compound in the long-form periodic table"), a phosphoric ester compound, and a titanium compound.

In some embodiments, the method includes adding a catalyst selected from tetra-n-propyl titanate, tetraisopropyl titanate, tetra-n-butyl titanate, titanium (oxy)acetyl acetonate, titanium tetraacetyl acetonate, titanium bis(ammonium lactate)dihydroxide, polyhydroxytitanium stearate, titanium lactate, or butyl titanate dimer; and adding a liquid material obtained by mixing an alcohol, a group 2 metal compound in the long-form periodic table, a phosphoric ester compound, and adding a titanium compound.

In some embodiments, the method includes adding a catalyst selected from tetra-n-butyl titanate, titanium (oxy) acetyl acetonate, titanium tetraacetyl acetonate, polyhydroxytitanium stearate, titanium lactate, or butyl titanate dimer; and adding a liquid material obtained by mixing an alcohol, a group 2 metal compound in the long-form periodic table, a phosphoric ester compound; and adding a titanium compound.

In some embodiments, the method includes adding a catalyst selected from tetra-n-butyl titanate, polyhydroxytitanium stearate, titanium (oxy)acetyl acetonate, titanium tetraacetyl acetonate; and adding a liquid material obtained by mixing an alcohol, a group 2 metal compound in the long-form periodic table, a phosphoric ester compound, and adding a titanium compound.

Non-limiting examples of the zirconium compound as a catalyst include, but are not limited to, zirconium tetraacetate, zirconium acetate hydroxide, zirconium tris(butoxy) stearate, zirconyl diacetate, zirconium oxalate, zirconyl oxalate, potassium zirconium oxalate, polyhydroxyzirconium stearate, zirconium ethoxide, zirconium tetra-n-propoxide, zirconium tetraisopropoxide, zirconium tetra-n-butoxide, zirconium tetra-t-butoxide, zirconium tributoxyacetyl acetonate, and mixtures thereof.

In some embodiments, the catalyst is selected from zirconyl diacetate, zirconium tris(butoxy)stearate, zirconium tetraacetate, zirconium acetate hydroxide, ammonium zirconium oxalate, potassium zirconium oxalate, polyhydroxyzirconium stearate, zirconium tetra-n-propoxide, zirconium tetraisopropoxide, zirconium tetra-n-butoxide, and zirconium tetra-t-butoxide are preferable; zirconyl diacetate, zirconium tetraacetate, zirconium acetate hydroxide, zirconium tris(butoxy)stearate, ammonium zirconium oxalate, zirconium tetra-n-propoxide, and zirconium tetra-n-butoxide. In some embodiments, the catalyst is selected from zirconium tris(butoxy)stearate. In some embodiments, a colorless polyester with a high degree of polymerization is easily obtained using zirconium tris(butoxy)stearate.

In some embodiments, the catalyst is a germanium compound. Non-limiting examples of the germanium compound include, but are not limited to, inorganic germanium compounds such as germanium oxide, germanium chloride, etc.; and organic germanium compounds such as a tetraalkoxygermanium, etc. From the standpoints of prices and easiness of availability, germanium oxide, tetraethoxygermanium, tetrabutoxygermanium, and the like are preferable, and germanium oxide is especially preferable.

In some embodiments, the catalyst is an inorganic chloride. Non-limiting examples of inorganic chlorides include, but are not limited to, such as ferric chloride, etc.; inorganic oxides such as triiron tetroxide, etc.; organic iron complexes such as ferrocene, etc.; and the like. In some embodiments, the catalyst is an inorganic oxides.

In some embodiments, the catalyst is a metal-containing compound. Non-limiting examples of metal-containing compounds include, but are not limited to scandium compounds such as scandium carbonate, scandium acetate, scandium chloride, scandium acetyl acetonate, etc.; yttrium compounds such as yttrium carbonate, yttrium chloride, yttrium acetate, yttrium acetyl acetonate, etc.; vanadium compounds such as vanadium chloride, vanadium trichloride oxide, vanadium acetyl acetonate, vanadium acetyl acetonate oxide, etc.; molybdenum compounds such as molybdenum chloride, molybdenum acetate, etc.; tungsten compounds such as tungsten chloride, tungsten acetate, tungstic acid, etc.; lanthanoid compounds such as cerium chloride, samarium chloride, ytterbium chloride, etc.; and the like.

Condensing

Aspects of the present disclosure include esterifying the alkane diol monomer and the alkane diacid agent monomer to form a plurality of oligomers; and condensing the plurality of oligomers to produce high MW polymers in the polymer-polysaccharide nanocomposite resin.

In some embodiments, condensing the plurality of oligomers is performed in a reaction vessel under reduced pressure. In some embodiments, the pressure of the vessel may be decreased during the condensation. In some embodiments, the condensing is performed at a pressure of about 500 mTorr. In some embodiments, the condensing is performed at a pressure of about 400 mTorr. In some embodiments, the condensing is performed at a pressure of about 300 mTorr. In some embodiments, the pressure may decrease from an initial pressure of about 700 Torr (i.e., atmospheric pressure) to a final pressure of about 500 mTorr. In some embodiments, the pressure may decrease from an initial pressure of about 710 Torr (i.e., atmospheric pressure) to a final pressure of about 500 mTorr. In some embodiments, the pressure may decrease from an initial pressure of about 720 Torr (i.e., atmospheric pressure) to a final pressure of about 500 mTorr. In some embodiments, the pressure may decrease from an initial pressure of about 730 Torr (i.e., atmospheric pressure) to a final pressure of about 500 mTorr. In some embodiments, the pressure may decrease from an initial pressure of about 740 Torr (i.e., atmospheric pressure) to a final pressure of about 500 mTorr. In some embodiments, the pressure may decrease from an initial pressure of about 750 Torr (i.e., atmospheric pressure) to a final pressure of about 500 mTorr. In some embodiments, the pressure may decrease from an initial pressure of about 760 Torr (i.e., atmospheric pressure) to a final pressure of about 500 mTorr.

In some embodiments, the pressure may decrease from an initial pressure of about 770 Torr (i.e., atmospheric pressure) to a final pressure of about 500 mTorr.

In some embodiments, the method includes pressurizing the reaction vessel at an initial pressure and heating the reaction vessel, followed by decreasing the initial pressure to a lower pressure.

In some embodiments, the pressure may decrease from an initial pressure of about 780 Torr (i.e., atmospheric pressure) to a final pressure of about 500 mTorr. In some embodiments, the pressure may decrease from an initial pressure of about 790 Torr (i.e., atmospheric pressure) to a final pressure of about 500 mTorr. In some embodiments, the pressure may decrease from an initial pressure of about 800 Torr (i.e., atmospheric pressure) to a final pressure of about 500 mTorr.

After esterification, the reaction vessel may be heated to about 225° C. to condensate the plurality of oligomers to produce high MW polymers in the polymer-polysaccharide nanocomposite resin.

In some embodiments, the temperature of the vessel may be gradually increased as the reaction progresses. In some embodiments, the temperature may be increased to about 200° C. or more, 210° C. or more, 220° C. or more, 230° C. or more, 240° C. or more, or 250° C. or more.

In some embodiments, the method includes adding an epoxy derivative or epoxidized oil at the end of the reaction. For example, in some embodiments, the epoxy derivative or epoxidized can be added after re-pressurizing the vessel just before the cool down and discharging of the polymer.

Post-Polymerization Additives

In some embodiments, the method includes adding one or more additional components after polymerization of the nanocomposite.

Uses of the Polymer-Polysaccharide Nanocomposite Resin in Making Yarn/Fiber

Aspects of the present disclosure include an article comprising a nanocomposite resin produces by the methods described herein.

In some embodiments, the article is manufactured from the nanocomposite resin using any known methods. Non-limiting examples of manufacturing methods include, but are not limited to injection molding, blow molding, compression molding, extrusion, and melt spinning.

In some embodiments, the article is a molded article molded to a mold temperature of In some embodiments, the article is yard or fiber.

In some embodiments, the polysaccharide-polymer nanocomposite resin (e.g., polybutylene succinate nanocomposite) produced by this method may then be formed into an article of manufacture. For example, in some embodiments, the process may include thermoforming, extrusion molding, injection molding or blow molding the composition in melted form.

In some embodiments, injection molding processes include any molding process in which a polymeric melt or a monomeric or oligomeric solution is forced under pressure, for instance with a ram injector or a reciprocating screw, into a mold where it is shaped and cured. Blow molding processes may include any method in which the extrudable polymer composition may be shaped with the use of a fluid and then cured to form a product. Blow molding processes may include extrusion blow molding, injection blow molding, and injection stretch blow molding, as desired. Non-limiting examples of extrusion molding methods include those in which the extrudable polymer composition is extruded from a die under pressure and cured to form the final product, e.g., a film or a fiber.

In some embodiments, single screw or twin screw extruders may be used, the selection of which and the amounts of each component being varied depending on the extruder will be within the skill of one in the art. Other molding methods may include gas foam molding, bead foam molding, T-dye film forming, stretch blow molding, inflation film forming and sheet forming.

In some embodiments, the resulting molded article is a container. The term "container" as used herein includes, but is not limited to, any article, receptacle, or vessel utilized for storing, dispensing, packaging, portioning, or shipping various types of products or objects (including but not limited to, food and beverage products). Non-limiting examples of such containers include, but are not limited to, boxes, cups, "clam shells", jars, bottles, plates, bowls, trays, cartons, cases, crates, cereal boxes, frozen food boxes, milk cartons, carriers for beverage containers, dishes, egg cartons, lids, straws, envelopes, stacks, bags, baggies, or other types of holders. Containment products and other products used in conjunction with containers are also intended to be included within the term "container."

In some embodiments, the molded article is a containment product that is a closure. The term "closure" as used herein, includes but is not limited to, any containment product such as caps, lids, liners, partitions, wrappers, films, cushioning materials, and any other product used in packaging, storing, shipping, portioning, serving, or dispensing an object within a container. Non-limiting examples of closures include, but are not limited to, screw caps, snap on caps, tamper-resistant, tamper-evident and child-resistant closures or caps.

The following examples are merely illustrative of the invention and are not limiting thereon.

EXAMPLES

Example 1

Pure PBS Made from Succinic Acid+Butanediol 113.55 g of 1,4 butanediol (BDO) and 141.71 g of succinic acid (SA) are charged to a 1 L glass reaction vessel. The reactants are stirred at 150 rpm with $N_2$ flow until a homogeneous slurry is formed. The temperature is then ramped to 225° C. over the course of about 100 minutes and the reaction mixture is stirred continually. During this ramp, water and THF are formed and removed from the reactor via a distillation apparatus. When the reaction reaches 225° C. 600 uL of catalyst is added (zirconium butoxide (ZBO) 80% wt. in 1-butanol, 470 ppm [Zr] in total) and the pressure inside the vessel is reduced gradually over the course of about an hour and a half to a final pressure of about 500 mTorr. The temperature is increased to 230° C. and the polycondensation reaction proceeds for 3 hours after this point. The vessel is re-pressurized and cooled down to 110° C. before removing the polymer. The reaction takes about 6 hours in total and produces a beige, semi-crystalline polymer.

Example 2

PBS With 0.1% wt. Nano Crystalline Cellulose (SA+BDO Method)

112.26 g of 1,4 butanediol (BDO) and 140.09 g of succinic acid (SA) are charged to a 1 L glass reaction vessel. The reaction is stirred at 150 rpm with $N_2$ flow until a homogeneous slurry is formed. 5.4 mL of a 4.8% wt. Nano Crystalline Cellulose (NCC) dispersion in DI water is added to the slurry to reach a total NCC concentration of ~0.1% wt. The temperature is then ramped to 225° C. over the course of about 2 hours and the reaction mixture is stirred continually. During this ramp, water and THF are formed and removed from the reactor via a distillation apparatus. When the reaction reaches 225° C. an amount of catalyst is added (zirconium butoxide (ZBO) 80% wt. in 1-butanol, 470 ppm [Zr] in total) and the pressure inside the vessel is reduced gradually over the course of about 2 hours to a final pressure of about 500 mTorr. The temperature is increased to 230° C. and the polycondensation reaction proceeds for 1 hour after this point. The vessel is re-pressurized and cooled down to 110° C. before removing the polymer. The reaction takes about 5 hours in total and produces a beige, semi-crystalline polymer.

Example 3

PBS With 0.4% wt. ELO (SA+BDO Method)

113.55 g of 1,4 butanediol (BDO) and 141.71 g of succinic acid (SA) are charged to a 1 L glass reaction vessel. The reactants are stirred at 150 rpm with $N_2$ flow until a homogeneous slurry is formed. The temperature is then ramped to 225° C. over the course of about 2 hours and the reaction mixture is stirred continually. During this ramp, water and THF are formed and removed from the reactor via a distillation apparatus. When the reaction reaches 225° C. 600 uL of catalyst is added (zirconium butoxide (ZBO) 80% wt. in 1-butanol, 470 ppm [Zr] in total) and the pressure inside the vessel is reduced gradually over the course of about an hour and a half to a final pressure of about 500 mTorr. The temperature is increased to 230° C. and the polycondensation reaction proceeds for 2 hours after this point. The vessel is re-pressurized and 1.03 g epoxidized linseed oil (ELO) is added to the melt and reacted for 15 minutes. The vessel is then cooled down to 110° C. before removing the polymer. The reaction takes about 7 hours in total and produces a beige, semi-crystalline polymer.

Example 4

PBS With 0.1% wt. NCC+0.4% wt. ELO (SA+BDO Method)

97.79 g of 1,4 butanediol (BDO) and 122.05 g of succinic acid (SA) are charged to a 1 L glass reaction vessel. The reactants are stirred at 150 rpm with $N_2$ flow until a homogeneous slurry is formed. 4.7 mL of a 4.8% wt. NCC dispersion in DI water is added to the slurry to reach a total NCC concentration of ~0.1% wt. The temperature is then ramped to 225° C. over the course of about 2 hours and the reaction mixture is stirred continually. During this ramp, water and THF are formed and removed from the reactor via a distillation apparatus. When the reaction reaches 225° C. 600 uL of catalyst is added (zirconium butoxide (ZBO) 80% wt. in 1-butanol, 470 ppm [Zr] in total) and the pressure inside the vessel is reduced gradually over the course of about an hour to a final pressure of about 500 mTorr. The temperature is increased to 230° C. and the polycondensation reaction proceeds for 1 hour after this point. The vessel is re-pressurized and 0.89 g ELO is added to the melt and reacted for 15 minutes. The vessel is then cooled down to 110° C. before removing the polymer. The reaction takes about 4.5 hours in total and produces a beige, semi-crystalline polymer.

Example 5

PBS with 1% wt. NCC (SA+BDO Method)

97.79 g of 1,4 butanediol (BDO) and 122.05 g of succinic acid (SA) are charged to a 1 L glass reaction vessel. The reaction is stirred at 150 rpm with $N_2$ flow until a homogeneous slurry is formed. 46.64 mL of a 4.8% wt. NCC dispersion in DI water is added to the slurry to reach a total NCC concentration of ~1% wt. The temperature is then ramped to 225° C. over the course of about 2 hours and the reaction mixture is stirred continually. During this ramp, water and THF are formed and removed from the reactor via a distillation apparatus. The reaction is a dark brown color. When the reaction reaches 225° C. an amount of catalyst is added (zirconium butoxide (ZBO) 80% wt. in 1-butanol, 470 ppm [Zr] in total) and the pressure inside the vessel is reduced gradually over the course of about 2 hours to a final pressure of about 500 mTorr. The temperature is increased to 230° C. and the polycondensation reaction proceeds for about 15 minutes after this point and is stopped prematurely due to the high viscosity of the polymer. The vessel is re-pressurized and cooled down to 110° C. before removing the polymer. The reaction takes about 4.5 hours in total and produces a dark brown, brittle polymer.

Example 6

PBS With 0.1% wt. NCC+0.4% wt. ELO Succinic Anhydride+BDO 115.35 g of BDO and 128.09 g of succinic anhydride (SAn) are charged to a 1 L reaction vessel. The reaction is stirred at 150 rpm with $N_2$ flow until a homogeneous slurry is formed. 23.95 g of a 1% wt. dispersion of BDO and NCCs is added to the reaction vessel and the reaction temperature is ramped to 110° C. over the course of 30 minutes. When the reaction reaches 110° C., an endotherm occurs and is measured through a thermocouple probe. Very soon after a large exotherm occurs and propels the temperature up to about 135° C. The temperature is then ramped to 225° C. over the course of 1 hour. During this ramp, water is formed and removed from the reactor. When the reaction reaches 225° C. 575 uL of catalyst is added (zirconium butoxide (ZBO) 80% wt. in 1-butanol, 470 ppm [Zr] in total) and the pressure inside the vessel is reduced gradually over the course of about an hour to a final pressure of about 500 mTorr. The temperature is then increased to 230° C. The reaction proceeds for 1 hour after this point, but it may also be stopped. The vessel is re-pressurized and 1 g of ELO is added to the mixture and reacted for about 15 mins. The reaction takes about 3.5 hrs and produces a material that is exceptionally tough and has a high melt viscosity, which aides in processing.

Example 7

PBS With 0.1% wt. NCC+0.4% wt. ELO Succinic Anhydride+BDO 491.31 g of BDO and 513.36 of succinic anhydride (SAn) are charged to a 2 L reaction vessel. The reaction is stirred at 190 rpm with $N_2$ flow until a homogeneous slurry is formed. 114.11 g of a 1% wt. dispersion of BDO and NCCs is added to the reaction vessel and the reaction temperature is ramped to 225° C. over the course of 110 minutes. When the reaction reaches 130° C., a mild endotherm occurs and is measured through a thermocouple probe. Very soon after an exotherm occurs and propels the temperature up to about 155° C. where it stabilizes and continues increasing to 225°

C. During this ramp, water is formed and removed from the reactor. When the reaction reaches 225° C. 2.45 g of catalyst is added (zirconium butoxide (ZBO) 80% wt. in 1-butanol, 470 ppm [Zr] in total) and the pressure inside the vessel is reduced gradually over the course of about an hour to a final pressure of about 500 mTorr. The temperature is then increased to 230° C. The reaction proceeds for 30 minutes after this point and the stirring speed is sequentially slowed down to 50 rpm as the viscosity of the melt increases. The vessel is re-pressurized and 4 g of ELO is added to the mixture and reacted for about 15 mins. Then 0.6 g of a 50% wt. phytic acid solution in DI water is added as a heat stabilizer and decolorizer. The reaction takes about 4 hrs and produces a material that is exceptionally tough and has a high melt viscosity, which aides in processing.

Example 8

(A): PBS benchmark

Example 9

(B): PBS epoxide capped

Example 10

(C): PBS NCC extended

Example 11

(D): PBS NCC extended, epoxide capped

Example 12

(E): PBS NCC extended 10×, epoxide capped

Example 13

(F): PBS via SAn NCC extended, epoxide capped

Example 14

(G): PBS NCC+epoxide extended, sonication method

Example 15

(H): PBS NCC+epoxide extended, high shear disperser method

As shown above, the term "capped" is defined herein as the reactant (ELO in this case) being added at the end of the reaction. In examples 9, 11, 12, and 13 this means that ELO was added after re-pressurizing the vessel just before the cool down and discharging of the polymer. The term "Extended" is defined as the reactant (NCCs, ELO) being added up front with the BDO and SA or SAn. In examples 11, 12, and 13 the NCCs is added in the beginning of the reaction in the form of a dispersion. In examples 14 and 15 ELO is added at the very end of the esterification process right before the catalyst is added and the polycondensation takes place. In these examples the ELO is allowed to react for 5 minutes before adding the catalyst.

The high shear disperser method follows the same process as the sonication method for time and power consumption, but instead uses the equipment described in https://www(dot)mixers(dot)com/products/high-speed-dispersers/.

Sonication of Cellulose-BDO Mixture

Cellulose-BDO mixtures are prepared by either: i) preparing a 1% wt. solution of NCCs in 1,4 butanediol by combining about 20 g of reactants into a 40 mL scintillation vial, or ii) adding about 20 g of a 4.8% wt. dispersion of NCCs in DI water (provided by CelluForce) into a 40 mL scintillation vial. Using a Qsonica Q55 Ultrasonic Homogenizer (available from Qsonica LLC) with a stainless steel probe tip (55 W), the cellulose-BDO mixture is pulse sonicated at 60% amplitude for a total of 5 minutes. The fully cellulose-BDO dispersion is added to the slurry under mixing and $N_2$.

Tensile Strength Testing of PBS Nanocomposites

Tensile strength testing for PBS nanocomposites is carried out according to ASTM D882-18: Standard Test Method for Tensile Properties of Thin Plastic Sheeting. Briefly, the materials are subject to a 20,000 lbs hot press at 145° C. for 15 minutes. Sheet thickness is controlled by spacers to about 1 mm. The samples are then cut into 50 mm×10 mm strips and a gauge length of about 30 mm is used for testing. The samples are kept at 20° C. with a moisture content of about 65% for either 24 or 72 hours. The samples are placed in the mechanical grips of an Instron and subjected to a crosshead speed of 6 mm/min. Sample thickness is measured as the average thickness at five different points along the gauge length.

Table 1 lists the tensile strengths of Examples 4-6 based on samples kept in 20° C. at a moisture content of 65%. Table 2 lists the tensile strengths of Examples 8-13 at 50 mm/min strain rate based on samples kept in 20° C. at a moisture content of 65% for 24 hours, and Table 3 lists the tensile strengths based on samples kept in for 72 hours. Table 4 lists the tensile strengths for Examples 11-13 at 6 mm/min strain rate and 24 hour conditioning, and Table 5 lists the tensile strengths based on 72 hour conditioning. Table 6 lists the tensile strength for a polymer fiber comprised of the PBS formed in Example 13 at 150 mm/min strain rate and 24 hour conditioning, and Table 7 lists the tensile strength at 55 mm/min strain rate with 24 hour conditioning.

TABLE 1

Tensile Strengths for Examples 4-6

| Example Conditioning Time | | Thickness Mm | Strain at Break % | Stress at Break MPa | Strain at Yield % | Stress at Yield MPa | Modulus MPa |
|---|---|---|---|---|---|---|---|
| Example 4 | Average | 0.62 | 15.16 | 30.07 | / | / | 349.20 |
| 24 hours | Median | 0.63 | 15.17 | 30.28 | / | / | 344.10 |
| | Std Dev | 0.05 | 1.49 | 1.97 | / | / | 20.20 |
| Example 4 | Average | 0.57 | 14.75 | 32.33 | / | / | 384.64 |
| 72 hours | Median | 0.56 | 14.80 | 32.70 | / | / | 374.50 |
| | Std Dev | 0.07 | 1.44 | 1.95 | / | / | 22.13 |

TABLE 1-continued

Tensile Strengths for Examples 4-6

| Example Conditioning Time | | Thickness Mm | Strain at Break % | Stress at Break MPa | Strain at Yield % | Stress at Yield MPa | Modulus MPa |
|---|---|---|---|---|---|---|---|
| Example 5 24 hours | Average | 0.66 | 14.84 | 29.83 | / | / | 351.30 |
| | Median | 0.66 | 14.93 | 29.76 | / | / | 344.60 |
| | Std Dev | 0.04 | 1.21 | 1.94 | / | / | 20.20 |
| Example 5 72 hours | Average | 0.68 | 9.55 | 26.39 | / | / | 375.63 |
| | Median | 0.68 | 9.25 | 26.84 | / | / | 375.80 |
| | Std Dev | 0.03 | 1.30 | 2.86 | / | / | 37.08 |
| Example 6 24 hours | Average | 0.53 | 81.45 | 33.32 | 25.57 | 35.30 | 307.80 |
| | Median | 0.52 | 89.60 | 33.20 | 26.88 | 35.56 | 289.40 |
| | Std Dev | 0.06 | 25.73 | 1.24 | 4.25 | 1.79 | 36.13 |
| Example 6 72 hours | Average | 0.49 | 49.45 | 27.82 | 26.26 | 32.54 | 337.45 |
| | Median | 0.48 | 63.27 | 27.68 | 26.18 | 33.19 | 348.70 |
| | Std Dev | 0.07 | 23.41 | 4.63 | 2.58 | 4.62 | 26.31 |

TABLE 2

Tensile strength for Examples 8-13 at 50 mm/min strain rate and 24 hour conditioning

| Sample | E (GPa) | $\sigma_y$ (MPa) | $\sigma_u$ (MPa) | $\epsilon_u$ (%) |
|---|---|---|---|---|
| 8 | 0.29 | 34 | 29 | 21 |
| 9 | 0.3 | 29 | 27 | 63 |
| 10 | 0.34 | 36 | 26 | 76 |
| 11 | 0.28 | 26 | 23 | 47 |
| 12 | 0.39 | N/A | 31 | 14 |
| 13 | 0.3 | 31 | 27 | 37 |

TABLE 3

Tensile strength for Examples 8-13 at 50 mm/min strain rate and 72 hour conditioning

| Sample | E (GPa) | $\sigma_y$ (MPa) | $\sigma_u$ (MPa) | $\epsilon_u$ (%) |
|---|---|---|---|---|
| 8 | 0.42 | N/A | 33 | 18 |
| 9 | 0.34 | N/A | 29 | 17 |
| 10 | 0.4 | 35 | 32 | 25 |
| 11 | 0.34 | 26 | 24 | 27 |
| 12 | 0.36 | N/A | 28 | 14 |
| 13 | 0.37 | 30 | 27 | 42 |

TABLE 4

Tensile strength for Examples 11-13 at 6 mm/min strain rate and 24 hour conditioning

| Sample | E (GPa) | $\sigma_y$ (Mpa) | $\sigma_u$ (Mpa) | $\epsilon_u$ (%) |
|---|---|---|---|---|
| 11 | 0.35 | N/A | 30 | 15 |
| 12 | 0.35 | N/A | 30 | 15 |
| 13 | 0.31 | 35 | 33 | 81 |

TABLE 5

Tensile strength for Examples 11-13 at 6 mm/min strain rate and 72 hour conditioning

| Sample | E (GPa) | $\sigma_y$ (MPa) | $\sigma_u$ (MPa) | $\epsilon_u$ (%) |
|---|---|---|---|---|
| 11 | 0.38 | N/A | 32 | 15 |
| 12 | 0.38 | N/A | 26 | 10 |
| 13 | 0.34 | 33 | 28 | 49 |

TABLE 6

Tensile strength for Example 13 (fiber) at 150 mm/min strain rate and 24 hour conditioning

| Sample | E (GPa) | $\sigma_u$ (MPa) | $\epsilon_u$ (%) |
|---|---|---|---|
| 13 | 0.9 | 48 | 473 |

TABLE 7

Tensile strength for Example 13 (fiber) at 55 mm/min strain rate and 24 hour conditioning

| Sample | E (GPa) | $\sigma_y$ (MPa) | $\sigma_u$ (MPa) | $\epsilon_u$ (%) |
|---|---|---|---|---|
| 13 | 0.48 | 33 | 64 | 179 |

The tensile strength data illustrate that the PBS nanocomposites synthesized using the methods disclosed herein are comparable to the benchmark PBS synthesized using traditional means known in the prior art. In some instances, the PBS nanocomposites exhibit improved properties over the benchmark PBS.

Intrinsic Viscosity Testing of PBS Nanocomposites

Intrinsic viscosity tests were conducted according to ASTM D445 and D2515 testing methods. Briefly, 4 g of material are dissolved in 100 mL of chloroform within a volumetric flask for two days. The polymer solution is then filtered with a glass-core funnel and diluted to different concentrations before being placed into a CANNON-FENSKE Viscometer (available from Cannon Instrument Company at State College, PA). The entire viscometer is kept in a water bath at about 25° C. for 10 minutes before each measurement. Each polymer solution is loaded into the device and the time it takes the solution to pass between the two red lines is measured. The intrinsic viscosity is calculated as the intersection between plots of the relative and specific viscosities at zero point concentration.

Table 8 lists the viscosity values for Examples 1-6, and Table 9 lists the viscosity values for Examples 8-15. Higher viscosity values are associated with higher molecular weight polymers and higher quality materials. Dispersion of NCC in BDO prior to esterification leads to higher viscosities for PBS nanocomposites, as exhibited in Example 15. Esterifying with succinic anhydride also increases the intrinsic viscosity for PBS nanocomposites in comparison to esterifying with succinic acid (see Examples 6 and 13).

TABLE 8

Intrinsic viscosity values for Examples 1-6

| | Example | | | | | |
|---|---|---|---|---|---|---|
| | 1 | 2 | 3 | 4 | 5 | 6 |
| Viscosity (dL/g) | 0.351 | 0.337 | 0.395 | 0.311 | 0.246 | 0.455 |

TABLE 9

Intrinsic viscosity values for Examples 8-15

| | Example | | | | | | | |
|---|---|---|---|---|---|---|---|---|
| | 8 | 9 | 10 | 11 | 12 | 13 | 14 | 15 |
| Viscosity (dL/g) | 0.35 | 0.4 | 0.34 | 0.31 | 0.25 | 0.46 | N/A | 1.04 |

Acid Value for Example 15

The acid value for Example 15 is determined according to ASTM D7409 standards. Briefly, about 0.6 g of the sample is dissolved in a chloroform/methanol solution. Phenolphthalein is added to the solution and is titrated with a Metrohm photometric titrator using 0.1 N KOH in ethanol. The acid value for Example 15 is about 0.9 mg KOH/g, which corresponds to about 16 carboxylic acid end group equivalents per metric ton.

Dynamic Viscosity

Dynamic viscosity value is determined by using a Brookfield HAHB viscometer. FIG. 1 provides a plot illustrating the relationship between viscosity versus temperature for Example 15. Dynamic viscosity value is determined by using a Brookfield AMETEK rotational viscometer with a #27 spindle and thermo container. A small amount of polymer was placed in the sample container and the temperature was raised to 230° C. to induce melting. Viscosity measurements were recorded incrementally as the sample temperature decreased overtime. Data collection stopped once the temperature neared the melting temperature of the polymer.

Differential Scanning Calorimetry (DSC)

Samples are placed in TA Instruments Q2000 equilibrated at 30° C. for 1 minute under nitrogen gas flow. For a first cycle, the calorimeter is ramped to 140° C. at 10° C./min. The sample is then placed on isothermal hold for 3 minutes. The calorimeter is ramped to −60° C. at 20° C./min for the second cycle. An isothermal hold is placed for two minutes to end the second cycle. A last cycle is performed wherein the calorimeter is ramped to 380° C. at 10° C./min.

Thermogravimetric Analysis (TGA)

Samples are equilibrated at 30° C. for 1 minute under nitrogen gas flow. The oven is heated to 600° C. at 10° C./min.

TABLE 10

Thermal Properties of Examples 8-15

| Sample | $T_g$ (° C.) | $T_m$ (° C.) | $T_c$ (° C.) | $T_{5\%}$ (° C.) | $X_c$ (%) |
|---|---|---|---|---|---|
| 8 | −23 | 113 | 63 | 354 | 52 |
| 9 | −23 | 113 | 69 | 356 | 47 |
| 10 | −23 | 114 | 67 | 354 | 51 |
| 11 | −26 | 107 | 80 | 347 | 48 |
| 12 | −21 | 107 | 85 | 342 | 45 |
| 13 | −23 | 106 | 82 | 344 | 45 |
| 13 (fiber) | −24 | 113 | 75 | 369 | 48 |
| 14 | N/A | N/A | N/A | N/A | N/A |
| 15 | N/A | N/A | N/A | N/A | N/A |

Thermal Analysis of Examples 8-15

Table 10 provides a comparison of numerous thermal properties of each PBS nanocomposite: 1) the glass transition temperature ($T_g$), 2) the crystalline melting temperature ($T_m$), 3) the cold crystallization temperature ($T_c$), 4) the decomposition temperature at 5% mass loss ($T_{5\%}$), and 5) the percent crystallinity ($X_c$). Most of the properties are substantially equivalent among the various PBS nanocomposites. The cold crystallization temperature is increased for PBS nanocomposites that are NCC extended and are esterified with epoxidized linseed oil. The polymer produced from example 13 was subjected to a basic melt spinning procedure using a twin-screw extruder fed into a spinneret block with 19 circular holes. The barrel temperature and spinneret were both set to 190° C. and the barrel pressure was held at 500 psi. Fibers were collected on a rotating drum under non-isothermal conditions and without any drawing procedures. At this temperature the polymer will begin to nucleate and grow crystalline domains. In some cases, having a higher $T_c$ will help with dimensional stability of the polymer.

1H-NMR

The polymers and compositions can be characterized by 1H NMR.

TABLE 11

Number average molecular weights of Examples 8-13

| | Example | | | | | |
|---|---|---|---|---|---|---|
| | 8 | 9 | 10 | 11 | 12 | 13 |
| $M_n$ (Da) | 32,360 | 24,812 | 40,699 | 29,066 | 17,326 | 40,401 |

The number average molecular weights for Examples 8-13 are provided in Table 11. The addition of succinic anhydride provides a higher $M_n$ in comparison to PBS nanocomposites esterified with succinic acid.

Particle Size Analysis

Polymer fiber produced from Example 13 is dissolved in chloroform at a concentration of 100 ppm. The solution is homogenized, then particle size analysis is performed using a Malvern Nano ZS Zetasizer. The absorption coefficient of the fiber is set to zero and the refractive index of the specimen is set to 1.49 (value for PBS). The experiment is run 5 times.

TABLE 12

Particle size distribution

| Size (d · nm) | Stdev (d · nm) | Vol (%) |
|---|---|---|
| Large gel particles volume | | |
| 226.8 | 33.35 | 1.0 |
| 236.6 | 41.73 | 2.7 |
| 117.8 | 15.19 | 0.2 |
| 226.8 | 33.35 | 1.0 |
| 225.8 | 33.74 | 2.3 |

TABLE 12-continued

Particle size distribution

| Size (d · nm) | Stdev (d · nm) | Vol (%) |
|---|---|---|
| 343.6 | 61.20 | 7.2 |
| 254.4 | 47.34 | 2.3 |
| Small gel particles volume | | |
| 7.985 | 1.007 | 99.0 |
| 14.73 | 2.282 | 95.8 |
| 16.87 | 3.157 | 97.3 |
| 4.692 | 0.612 | 99.8 |
| 7.985 | 1.007 | 99.0 |
| 13.69 | 2.018 | 97.7 |
| 16.66 | 2.780 | 92.8 |

Figure 2:
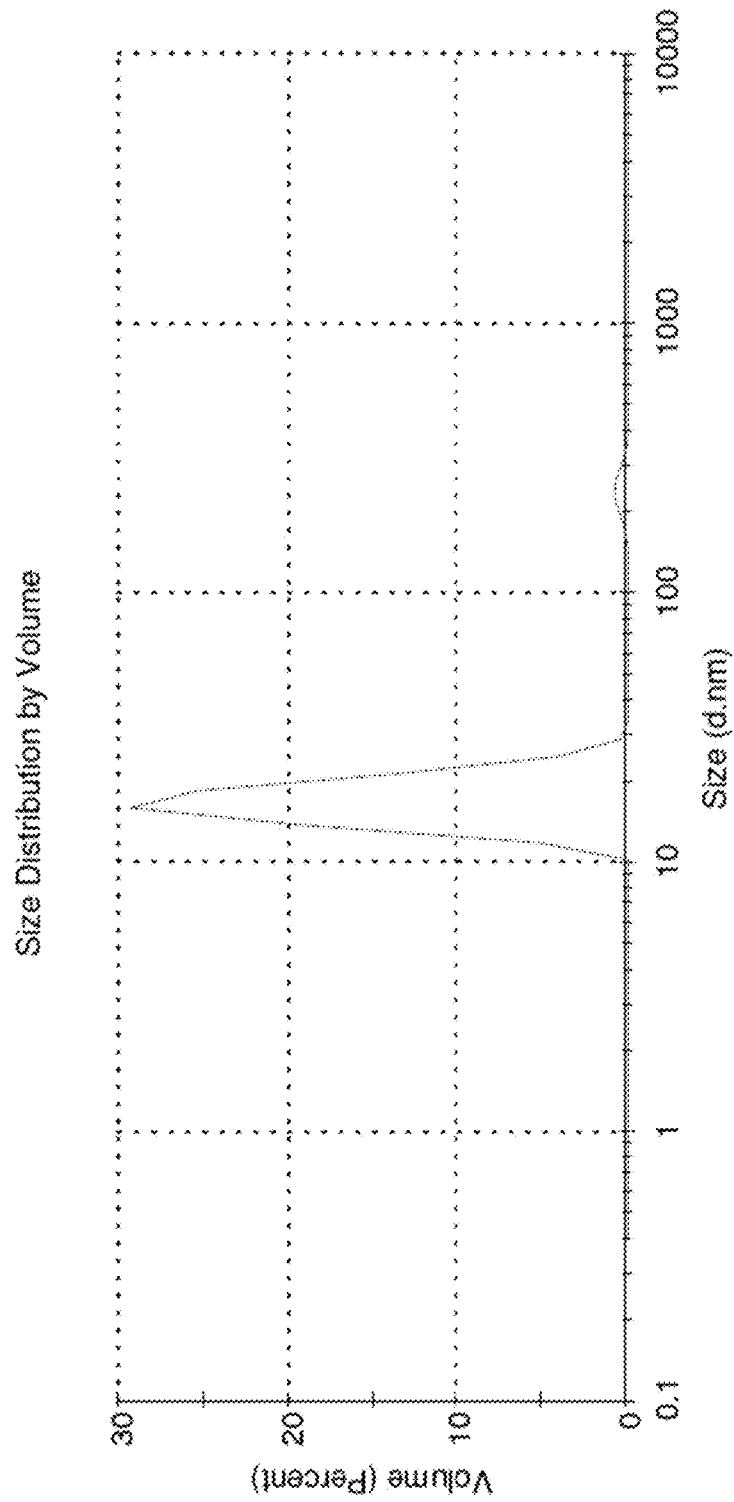
FIG. 2 is a particle size distribution plot for a polymer fiber comprising materials as shown in Example 13.

Table 12 and FIG. 2 show the particle size distribution for the dissolved polymer fiber. The majority of the particles for the polymer fiber have an average diameter between about 10-30 nm.

Particle Size Analysis for NCC Dispersed using Sonication

Nano crystalline cellulose is slowly added to 1,4 butanediol at 1:10 (w/w) while stirring. The solution is continuously stirred and mixed to obtain a thick white liquid with no lumps present. Samples are dispersed at different amplitudes (60%, 80% and 100%) at a frequency of 1 Hz. For each amplitude, samples are collected at 1 minute, 3 minutes, and 5 minutes of sonication. Each sample is diluted using distilled water at 5% (w/v). Particle size analysis of the sample is performed using Malvern Nano ZS Zetasizer. The absorption coefficient of NCCs is set to 0.001 and the refractive index is set as 1.58. The absorption coefficient of water is set to zero and the refractive index is set as 1.33. Experiments are repeated 5 times for each of the 9 runs to confirm reproducibility and improve accuracy of gel size and polydispersity index.

TABLE 13

Particle size distribution for NCC dispersed using sonication

| Amplitude | Dispersion Time (minutes) | Small Size Particles (d · nm) | Stdev. (d · nm) | Vol (%) | Medium Size Particles (d · nm) | Stdev. (d · nm) | Vol (%) | Large Size Particles (d · nm) | Stdev. (d · nm) | Vol (%) |
|---|---|---|---|---|---|---|---|---|---|---|
| 60% | 1 | 4.06 | 0.91 | 86.9 | 14.01 | 5.66 | 12.7 | 95.47 | 35.17 | 0.3 |
| | 3 | 4.44 | 1.06 | 89.9 | 15.18 | 4.93 | 9.7 | 109.4 | 32.52 | 0.2 |
| | 5 | 7.97 | 2.1 | 94.3 | 29.67 | 9.16 | 5.1 | 283.9 | 117.6 | 0.6 |
| 80% | 1 | 5.61 | 1.36 | 95.4 | 17.18 | 6.03 | 3.2 | 89.11 | 28.78 | 1.3 |
| | 3 | 11.8 | 3.16 | 96.7 | 60.65 | 17.74 | 1.9 | 385.6 | 136 | 1.4 |
| | 5 | 10.44 | 2.68 | 97.2 | 52.91 | 17.51 | 1.2 | 71.96 | 28.56 | 1.6 |
| 100% | 1 | 10.92 | 3.12 | 93.8 | 36.42 | 12.01 | 4.7 | 340.9 | 168.7 | 1.4 |
| | 3 | 6.04 | 1.65 | 92.7 | 22.13 | 18.41 | 7.1 | 298.8 | 197.2 | 0.2 |
| | 5 | 9.99 | 2.97 | 97.5 | 69.72 | 33.51 | 1.1 | 95.92 | 33.16 | 1.5 |

Figure 3:
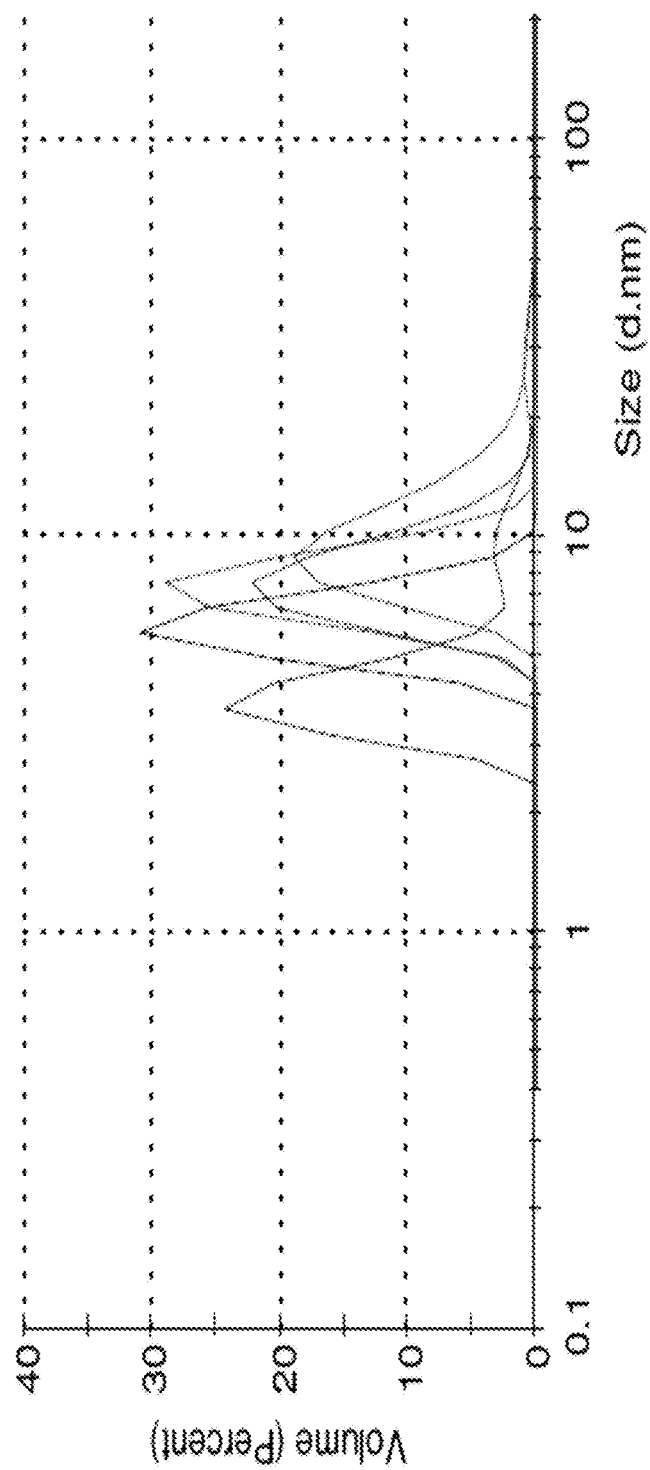
FIG. 3 is a particle size distribution plot for cellulose nanocrystals dispersed in 1,4 butanediol at a sonication amplitude of 60%.
Figure 4:
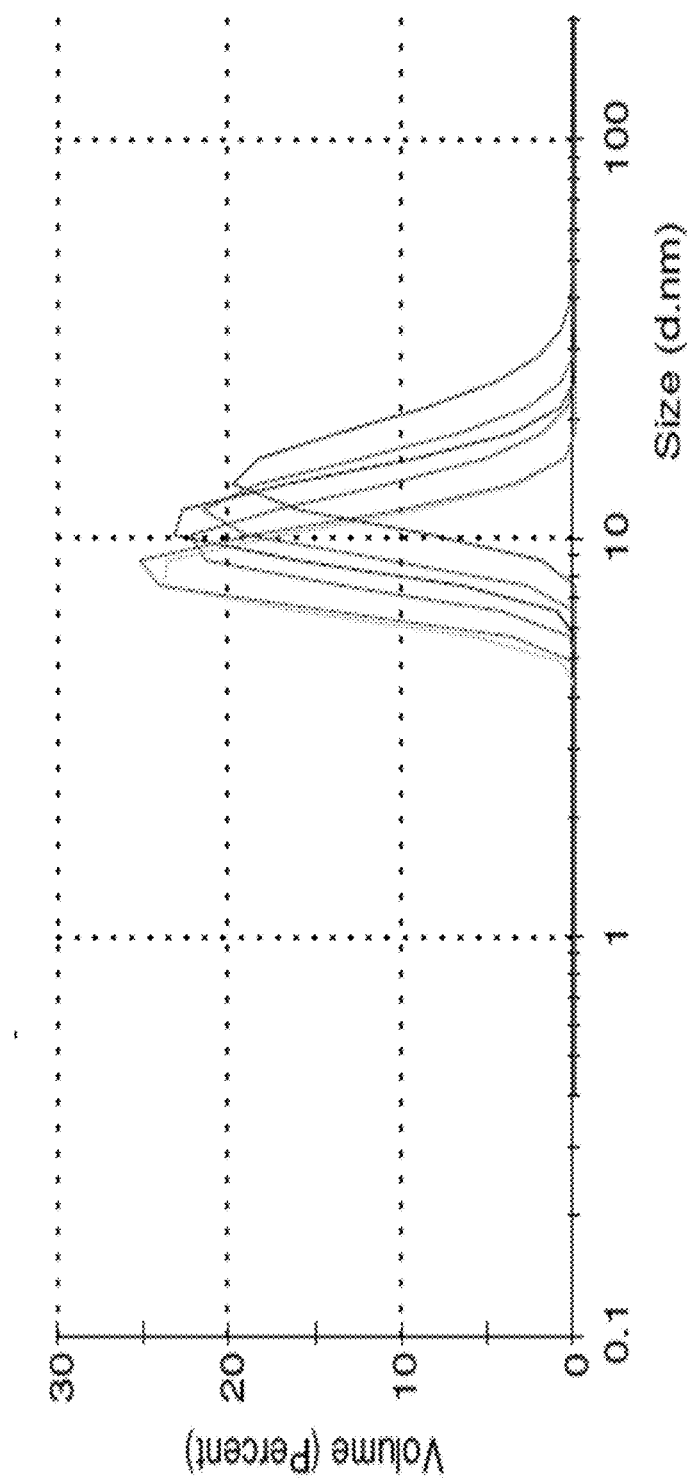
FIG. 4 is a particle size distribution plot for cellulose nanocrystals dispersed in 1,4 butanediol at a sonication amplitude of 80%.
Figure 5:
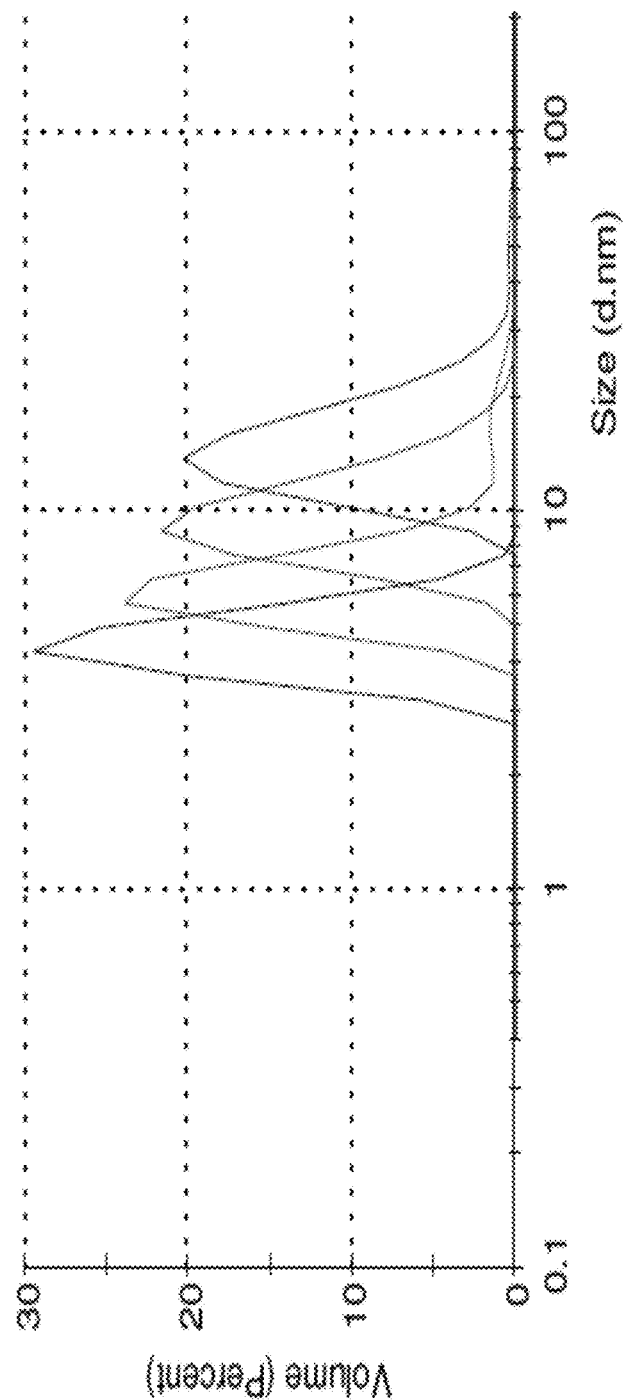
FIG. 5 is a particle size distribution plot for cellulose nanocrystals dispersed in 1,4 butanediol at a sonication amplitude of 100%.

FIGS. 3-5 and Table 13 compare particle size distribution data across different time points and amplitudes of sonication. Particle sizes correlate with the extent of dispersion of NCC in BDO, wherein smaller particle sizes indicate increased NCC dispersion. Higher amplitudes of sonication generally leads to increased levels of NCC dispersion (indicated by the higher distribution of small particle sizes), particularly for short durations of sonication. The differences between sonication values decrease as the duration increases. Similarly, longer durations of sonication provide greater NCC dispersion.

Particle Size Analysis for NCC Dispersed Using Homogenization

Nano crystalline cellulose is slowly added to 1,4 butanediol at 1:10 (w/w) while stirring. The solution is continuously stirred and mixed to obtain a thick white liquid with no lumps present. Samples are dispersed at three different homogenizer speeds, ranging from 10000 rpm to 16667 rpm. For each speed setting, samples are collected at 1 minute, 3 minutes, and 5 minutes of homogenizing. Each sample is diluted using distilled water at 5% (w/v). Particle size analysis of the sample is performed using Malvern Nano ZS Zetasizer. The absorption coefficient of Nccs is set to 0.001 and the refractive index is set as 1.58. The absorption coefficient of water is set to zero and the refractive index is set as 1.33. Experiments are repeated 5 times for each of the 9 runs to confirm reproducibility and improve accuracy of gel size and polydispersity index.

TABLE 14

Particle size distribution for NCC dispersed using homogenization

| Speed (1000 rpm) | Dispersion Time (minutes) | Small Size Particles (d · nm) | Stdev. (d · nm) | Vol (%) | Medium Size Particles (d · nm) | Stdev. (d · nm) | Vol (%) | Large Size Particles (d · nm) | Stdev. (d · nm) | Vol (%) |
|---|---|---|---|---|---|---|---|---|---|---|
| 10 | 1 | | | | 53.62 | 12.98 | 55.3 | 462.8 | 122.4 | 44.7 |
| | 3 | | | | 66.93 | 14.18 | 18.4 | 951.2 | 252.6 | 81.6 |
| | 5 | | | | 53.51 | 9.69 | 29.6 | 908.4 | 199.2 | 70.4 |
| 13.33 | 1 | | | | 25.55 | 4.25 | 82.6 | 679.2 | 118.3 | 17.4 |
| | 3 | | | | 29.52 | 4.86 | 84.3 | 547.2 | 83.35 | 15.7 |
| | 5 | | | | 23.00 | 3.61 | 92.3 | 413.9 | 67.52 | 7.7 |
| 16.66 | 1 | 9.13 | 7.41 | 97.1 | | | | 897.5 | 420.4 | 2.8 |
| | 3 | | | | 33.09 | 5.45 | 72.7 | 665.4 | 123.4 | 27.3 |
| | 5 | | | | 58.29 | 11.31 | 55.8 | 468.0 | 90.73 | 44.2 |

Figure 6:
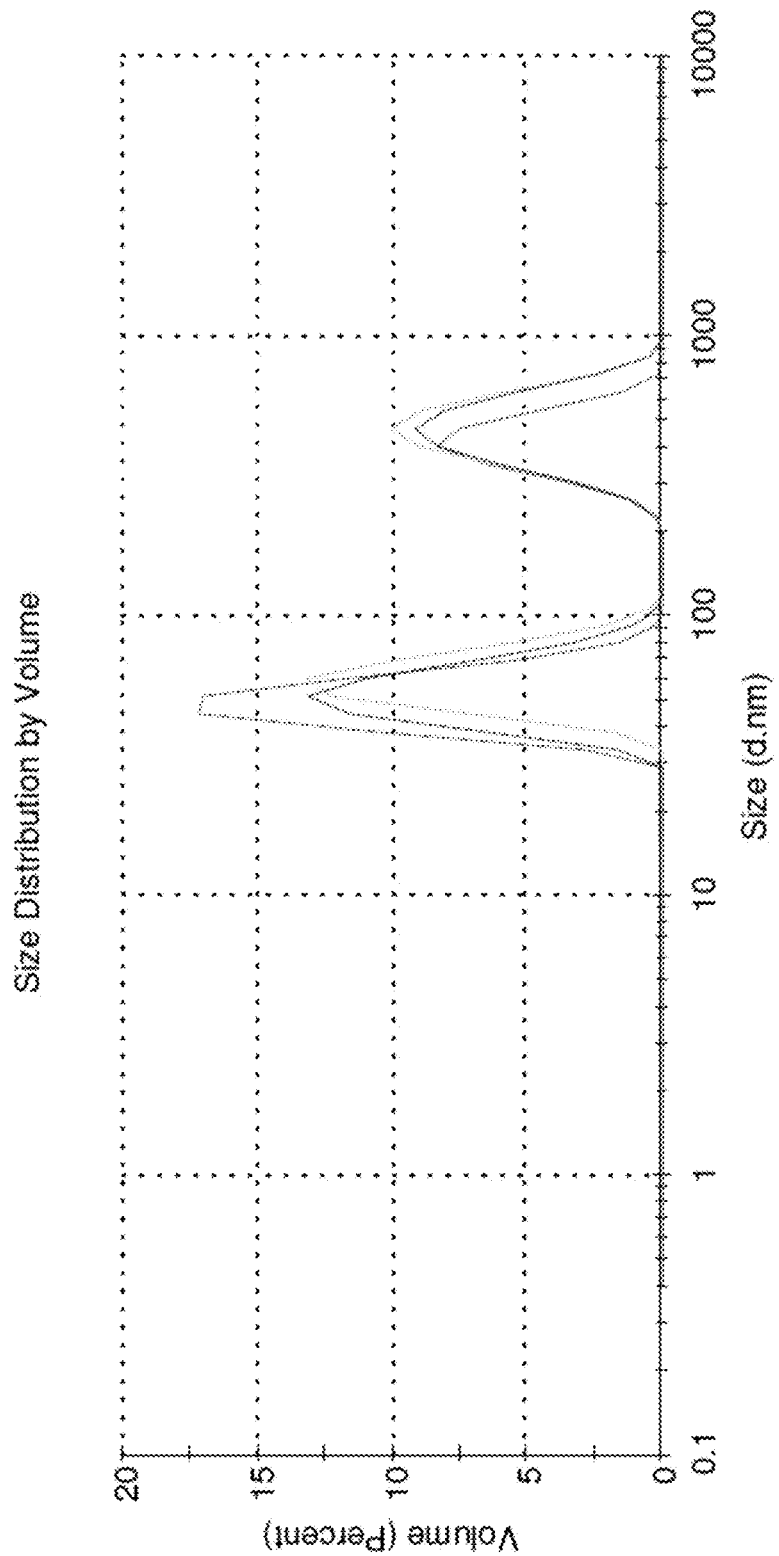
FIG. 6 is a particle size distribution plot for cellulose nanocrystals dispersed in 1,4 butanediol at a homogenizer speed of 10000 rpm for 1 minute.
Figure 7:
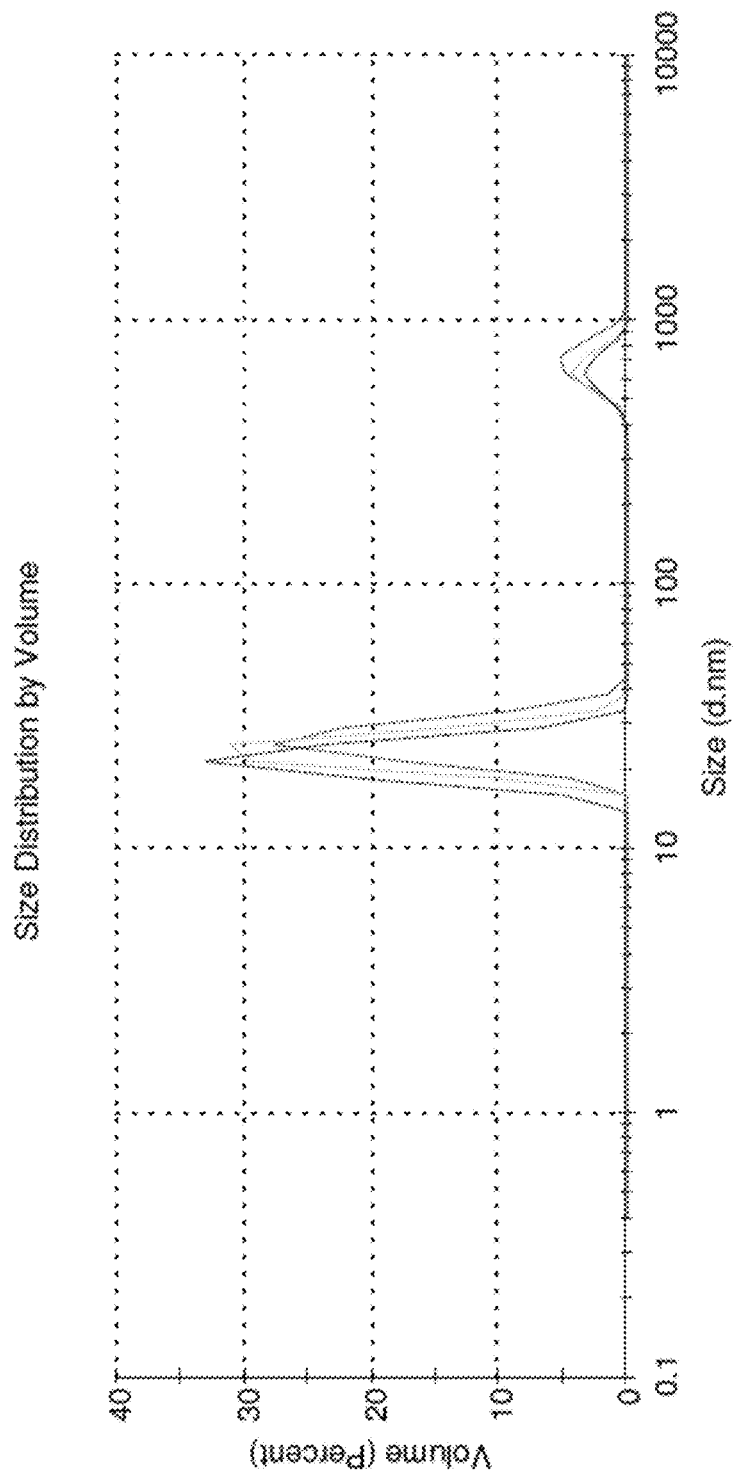
FIG. 7 is a particle size distribution plot for cellulose nanocrystals dispersed in 1,4 butanediol at a homogenizer speed of 13333 rpm for 1 minute.
Figure 8:
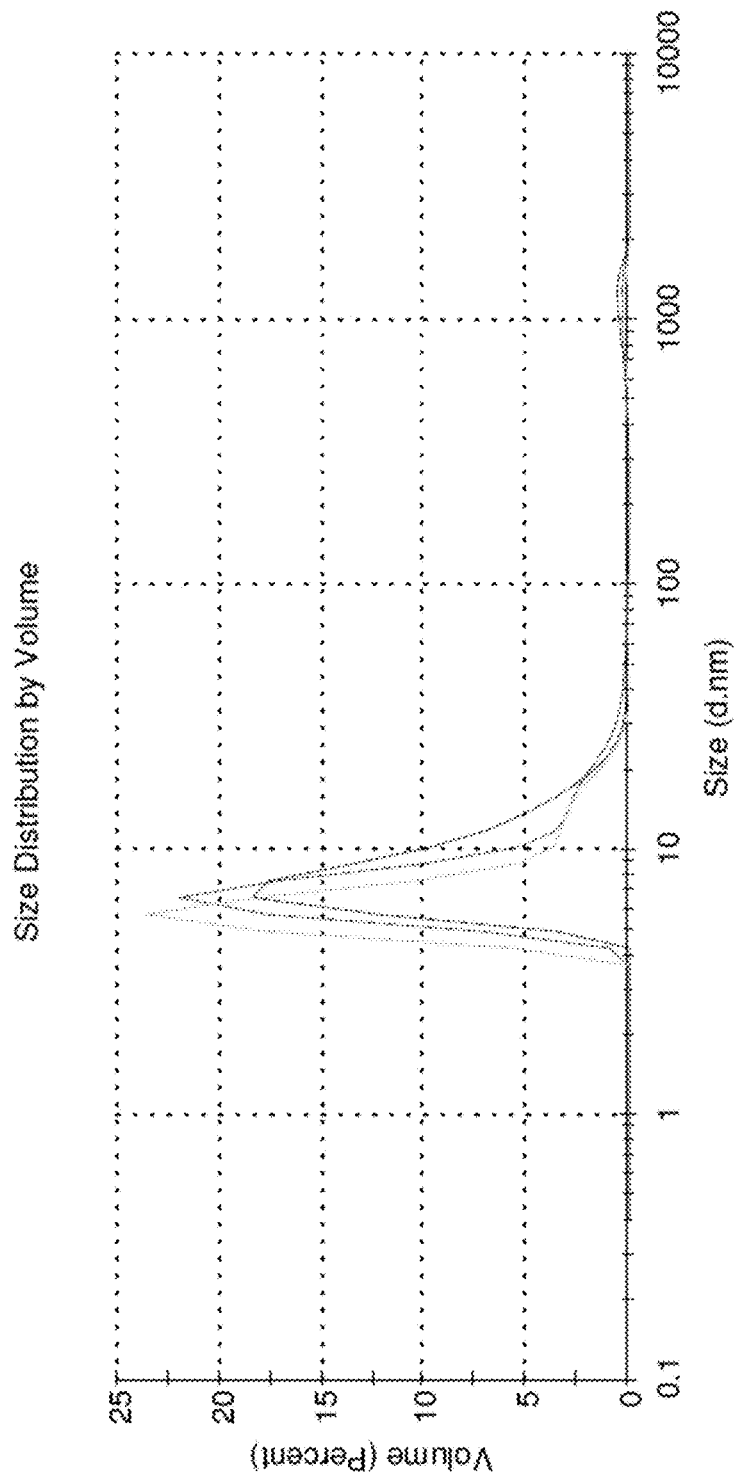
FIG. 8 is a particle size distribution plot for cellulose nanocrystals dispersed in 1,4 butanediol at a homogenizer speed of 16666 rpm for 1 minute.

FIGS. 6-8 and Table 14 compare particle size distribution data across different time points and speeds of homogenization. Higher speeds correspond to higher shear levels and particle sizes correlate with the extent of dispersion of NCC in BDO, wherein smaller particle sizes indicate increased NCC dispersion. As seen in Table 14, a high speed of homogenization is needed to effectively disperse NCC. Speeds of 13,330 and 10,000 rpm results in a higher distribution of medium and large particle sizes.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

What is claimed is:

1. A method of preparing an NCC-in-1,4-butanediol dispersion, the method comprising: combining NCC and 1,4-butanediol with mixing; wherein the dispersion is characterized as a nematic mesophase.
2. The method of claim 1, wherein the dispersion is characterized as a chiral nematic mesophase.
3. The method of claim 1, wherein the dispersion is mixed by ultrasonication.
4. The method of claim 1, wherein the dispersion is mixed by agitation.
5. The method of claim 4 wherein the dispersion is mixed by agitation in a homogenizer operating within the range of 10,000 rpm to 16,677 rpm.
6. The method of claim 1, wherein the method further comprises heating and filtering the dispersion.
7. The method of claim 1, wherein the dispersion is characterized by having particles with a size distribution from about 4 to 500 d·nm.
8. The method of claim 1, wherein the dispersion is characterized by having particles with a size distribution from about 10 to 1000 d·nm.
9. The method of claim 1, wherein the NCC is derived from heparin, chitosan, chitin, hyaluronan, starch, cellulose, alginate, pectin, guar, or chitin.
10. The method of claim 1, wherein the NCC is derived from cellulose, starch, or chitin.
11. The method of claim 1, wherein the NCC-to-diol monomer ratio is 1:10 (w/w).
12. The method of claim 1, wherein the average width of the NCC is from about 1 to 100 nm.
13. The method of claim 1, wherein the average length of the NCC is from about 25 to 3000 nm.
14. The method of claim 1, wherein the average length-to-diameter NCC aspect ratio is between 10 and 200.
15. The method of claim 5 wherein the dispersion is mixed by agitation in a homogenizer operating within the range of 10,000 rpm to 13,300 rpm.
16. The method of claim 1, wherein the NCC was produced by sulfuric acid hydrolysis, hydrochloric acid hydrolysis, hydrobromic acid hydrolysis, or phosphoric acid hydrolysis.
17. The method of claim 1, wherein the NCC was produced by hydrochloric and/or hydrobromic acid hydrolysis, followed by TEMPO-oxidation.
18. The method of claim 16, wherein the NCC comprises glucopyranose repeat units of the formula

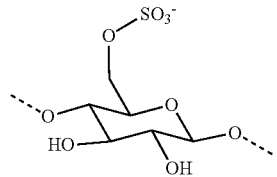

or

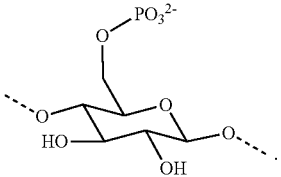

.

19. The method of claim 18, wherein the NCC comprises glucopyranose repeat units of the formula

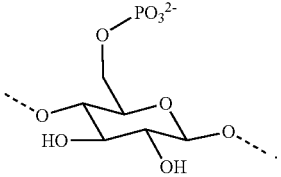

.

20. The method of claim 17, wherein the NCC comprises glucopyranose repeat units of the formula

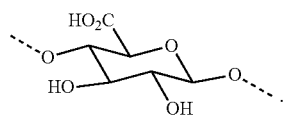
\* \* \* \* \*